US011735952B2

(12) United States Patent
Nagabhushanrao et al.

(10) Patent No.: US 11,735,952 B2
(45) Date of Patent: Aug. 22, 2023

(54) COUPLED-INDUCTOR-BASED POWER-DEVICE CIRCUIT TOPOLOGY

(71) Applicant: SCHNEIDER ELECTRIC IT CORPORATION, Foxboro, MA (US)

(72) Inventors: Pradeep Tolakanahalli Nagabhushanrao, Bangalore (IN); Chandrasekaran Jayaraman, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 165 days.

(21) Appl. No.: 16/988,215

(22) Filed: Aug. 7, 2020

(65) Prior Publication Data

US 2021/0044140 A1 Feb. 11, 2021

(30) Foreign Application Priority Data

Aug. 8, 2019 (IN) .............................. 201911032134

(51) Int. Cl.
*H02J 9/06* (2006.01)
(52) U.S. Cl.
CPC .............. *H02J 9/062* (2013.01); *H02J 9/061* (2013.01)
(58) Field of Classification Search
CPC ........ H02J 9/00; H02J 9/04; H02J 9/06; H02J 9/061; H02J 9/062; H02J 9/063; H02J 9/068; H02M 7/5387; H02M 5/4585; H02M 1/10
See application file for complete search history.

(56) References Cited

U.S. PATENT DOCUMENTS

| 6,121,756 | A | 9/2000 | Johnson, Jr. et al. |
| 6,501,194 | B1 * | 12/2002 | Jiang ................. H02M 3/33584 307/151 |
| 2006/0119184 | A1 * | 6/2006 | Chen ....................... H02J 9/062 307/66 |

(Continued)

FOREIGN PATENT DOCUMENTS

EP        3503366 A1    6/2019

OTHER PUBLICATIONS

Extended European Search Report from corresponding European Application No. 20189944.0 dated Dec. 17, 2020.

*Primary Examiner* — Rexford N Barnie
*Assistant Examiner* — Rasem Mourad
(74) *Attorney, Agent, or Firm* — Lando & Anastasi, LLP

(57) ABSTRACT

According to an aspect of the present disclosure, an uninterruptible power supply (UPS) system is provided. The UPS system includes a first input configured to be coupled to an input power source, a second input configured to be coupled to an energy storage device, an output configured to provide output power, a power conversion circuit (PCC) configured to convert power received from at least one of the input power source or the energy storage device, an output circuit coupled to the PCC and the output, and a controller. The PCC includes a first inductor and a second inductor magnetically coupled to the first inductor. The controller is configured to control the PCC to provide, via the first inductor, DC power derived from the input power source to the output circuit, and provide, via the first and second inductors, DC power derived from the energy storage device to the output circuit.

15 Claims, 14 Drawing Sheets

(56) References Cited

U.S. PATENT DOCUMENTS

| | | | | |
|---|---|---|---|---|
| 2012/0175958 A1* | 7/2012 | Dighrasker | ......... | H02M 3/1582 |
| | | | | 307/66 |
| 2013/0076141 A1 | 3/2013 | Paulakonis et al. | | |
| 2018/0287504 A1* | 10/2018 | Parsekar | ............... | H02M 7/487 |
| 2019/0199126 A1* | 6/2019 | Cheng | .................... | H02J 9/062 |

* cited by examiner

COUPLED-INDUCTOR-BASED POWER-DEVICE CIRCUIT TOPOLOGY

CROSS-REFERENCE TO RELATED APPLICATION

This application claims priority under 35 U.S.C. § 119 to Indian Patent Application No. 201911032134, titled "COUPLED-INDUCTOR-BASED POWER-DEVICE CIRCUIT TOPOLOGY," filed on Aug. 8, 2019, which is hereby incorporated by reference in its entirety.

BACKGROUND OF THE INVENTION

1. Field of the Invention

At least one example in accordance with the present invention relates generally to power devices.

2. Discussion of Related Art

The use of power devices, such as UPSs, to provide regulated, uninterrupted power for sensitive and/or critical loads, such as computer systems and other data processing systems, is known. Known uninterruptible power supplies include on-line UPSs, offline UPSs, line interactive UPSs, as well as others. Online UPSs provide conditioned AC power as well as back-up AC power upon interruption of a primary source of AC power. Offline UPSs typically do not provide conditioning of input AC power, but do provide back-up AC power upon interruption of the primary AC power source. Line interactive UPS s are similar to off-line UPS s in that they switch to battery power when a blackout occurs but also typically include a multi-tap transformer for regulating the output voltage provided by the UPS. Certain UPSs can include multiple power conversion stages.

SUMMARY

According to at least one aspect of the present disclosure an uninterruptible power supply (UPS) system including a first input configured to be coupled to an input power source, a second input configured to be coupled to an energy storage device, an output configured to provide output power, a power conversion circuit configured to convert power received from at least one of the input power source or the energy storage device, the power conversion circuit including a primary branch portion having a first inductor, and a backup branch portion having a second inductor, the second inductor being magnetically coupled to the first inductor, an output circuit coupled to the power conversion circuit and to the output, and a controller coupled to the power conversion circuit and to the output circuit, and configured to control the power conversion circuit to provide, in a normal mode of operation via the first inductor, DC power derived from the input power source to the output circuit, and control the power conversion circuit to provide, in a backup mode of operation via the first inductor and the second inductor, DC power derived from the energy storage device to the output circuit.

In an embodiment, the output circuit includes a first capacitor configured to be coupled to the power conversion circuit and a second capacitor configured to be coupled to the power conversion circuit. In one embodiment, the primary branch portion includes a third inductor, and the backup branch portion includes a fourth inductor, and wherein the third inductor is magnetically coupled to the fourth inductor. In at least one embodiment, the second inductor is coupled to a first switching device, and wherein the fourth inductor is coupled to a second switching device. In some embodiments, the controller is further configured to control the first switching device to charge a first capacitor, and is configured to control the second switching device to charge a second capacitor.

In at least one embodiment, the controller is further configured to control the first switching device to charge the first capacitor at a first rate and is configured to control the second switching device to charge the second capacitor at a second rate different than the first rate. In some embodiments, the controller is further configured to control the first switching device and the second switching device to charge the first capacitor simultaneously with the second capacitor.

In some embodiments, controlling the first switching device to charge the first capacitor includes controlling the first switching device to enable the energy storage device to provide current to the second inductor, wherein providing current to the second inductor includes inducing a voltage across the first inductor, and controlling the first switching device to disable the energy storage device from providing current to the second inductor, wherein the first inductor is configured to discharge to the first capacitor responsive to the switching device disabling the energy storage device.

In at least one embodiment, controlling the second switching device to charge the second capacitor includes controlling the second switching device to enable the energy storage device to provide current to the fourth inductor, wherein providing current to the fourth inductor includes inducing a voltage across the third inductor, and controlling the second switching device to disable the energy storage device from providing current to the fourth inductor, wherein the third inductor is configured to discharge to the second capacitor responsive to the switching device disabling the energy storage device.

In some embodiments, the output power includes an output waveform having a positive portion and a negative portion, and the positive portion of the output waveform is derived from power provided by the first capacitor, and the negative portion of the output waveform is derived from power provided by the second capacitor. In one embodiment, the primary branch portion is galvanically isolated from the backup branch portion. In some embodiments, the backup branch portion further includes a switching device having a first connection coupled to the energy storage device and a second connection switchably coupled to the second inductor, and a diode having an anode connection coupled to the first connection of the switching device and a cathode connection coupled to the second connection of the switching device.

In at least one embodiment, the system further comprises a switching device including a first connection coupled to the output, and a second connection configured to be coupled to one of the output circuit or the first input, wherein the controller is configured to control the switching device to connect the second connection to the first input in a bypass mode of operation, and is configured to control the switching device to connect the second connection to the output circuit in the normal mode of operation and the backup mode of operation. In some embodiments, the system further comprises a first diode having a cathode connection coupled to the first inductor, and an anode connection coupled to a reference node, and a second diode having a cathode connection coupled to the reference node, and an anode connection coupled to the third inductor.

According to at least one aspect of the disclosure, a system is provided including a first input configured to be coupled to an alternating current (AC) power source, a second input configured to be coupled to an energy storage device, an output configured to provide output power derived from at least one of the first input or the second input, an output circuit coupled to the output, the output circuit including a positive direct current (DC) bus and a negative DC bus, and means for independently providing power derived from at least one of the first input or the second input to the positive DC bus and the negative DC bus.

In one embodiment, the output circuit includes a first capacitor and a second capacitor. In at least one embodiment, the system further includes means for charging the first capacitor at a first rate and means for charging the second capacitor at a second rate different than the first rate. In some embodiments, the system further includes means for charging the first capacitor and the second capacitor simultaneously. In an embodiment, the output power is AC power having a positive portion and a negative portion, and wherein the positive portion of the output power is derived from power provided by the first capacitor, and wherein the negative portion of the output power is derived from power provided by the second capacitor. In some embodiments, the second input is galvanically isolated from the output circuit. In at least one embodiment, the system further includes means for providing output power derived from the first input to the output and bypassing the output circuit.

According to at least one aspect of the disclosure, a non-transitory computer-readable medium storing thereon sequences of computer-executable instructions for controlling a power device is provided comprising a first input to receive first input power, a second input to receive second input power, an output to provide output power, an output circuit to provide the output power to the output, and a power conversion circuit including a primary branch portion having a first inductor, and a backup branch portion having a second inductor, the second inductor being magnetically coupled to the first inductor, the sequences of computer-executable instructions including instructions that instruct at least one processor to control one or more switching devices in the power device to receive, by the first inductor in a normal mode of operation, the first input power, provide, by the first inductor in the normal mode of operation, first power derived from the first input power to the output circuit, receive, by the second inductor in a backup mode of operation, the second input power, store, by the second inductor in the backup mode of operation, first stored energy derived from the second input power, store, by the first inductor in the backup mode of operation, second stored energy derived from the first stored energy, and provide, by the first inductor in the backup mode of operation, second power derived from the second stored energy to the output circuit.

In some embodiments, the output circuit includes a first capacitor and a second capacitor, wherein the primary branch portion further includes a third inductor, and wherein the backup branch portion includes a fourth inductor magnetically coupled to the third inductor, the sequences of computer-executable instructions further including instructions that instruct the at least one processor to control the one or more switching devices to provide, by the first inductor and the third inductor, a first charging current to the first capacitor and a second charging current to the second capacitor.

In at least one embodiment, the sequences of computer-executable instructions further including instructions that instruct the at least one processor to control the one or more switching devices to provide the first charging current to the first capacitor at a first rate and provide the second charging current to the second capacitor at a second rate, wherein the first rate is different than the second rate and wherein the first charging current is provided simultaneously with the second charging current.

In some embodiments, the power device further includes a switching device having a first connection coupled to the output, and a second connection configured to be coupled to one of the output circuit or the first input, and wherein the sequences of computer-executable instructions further include instructions that instruct the at least one processor to control the switching device to connect the second connection to the first input in a bypass mode of operation, and to control the switching device to connect the second connection to the output circuit in the normal mode of operation and the backup mode of operation

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE INVENTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Figure 1:
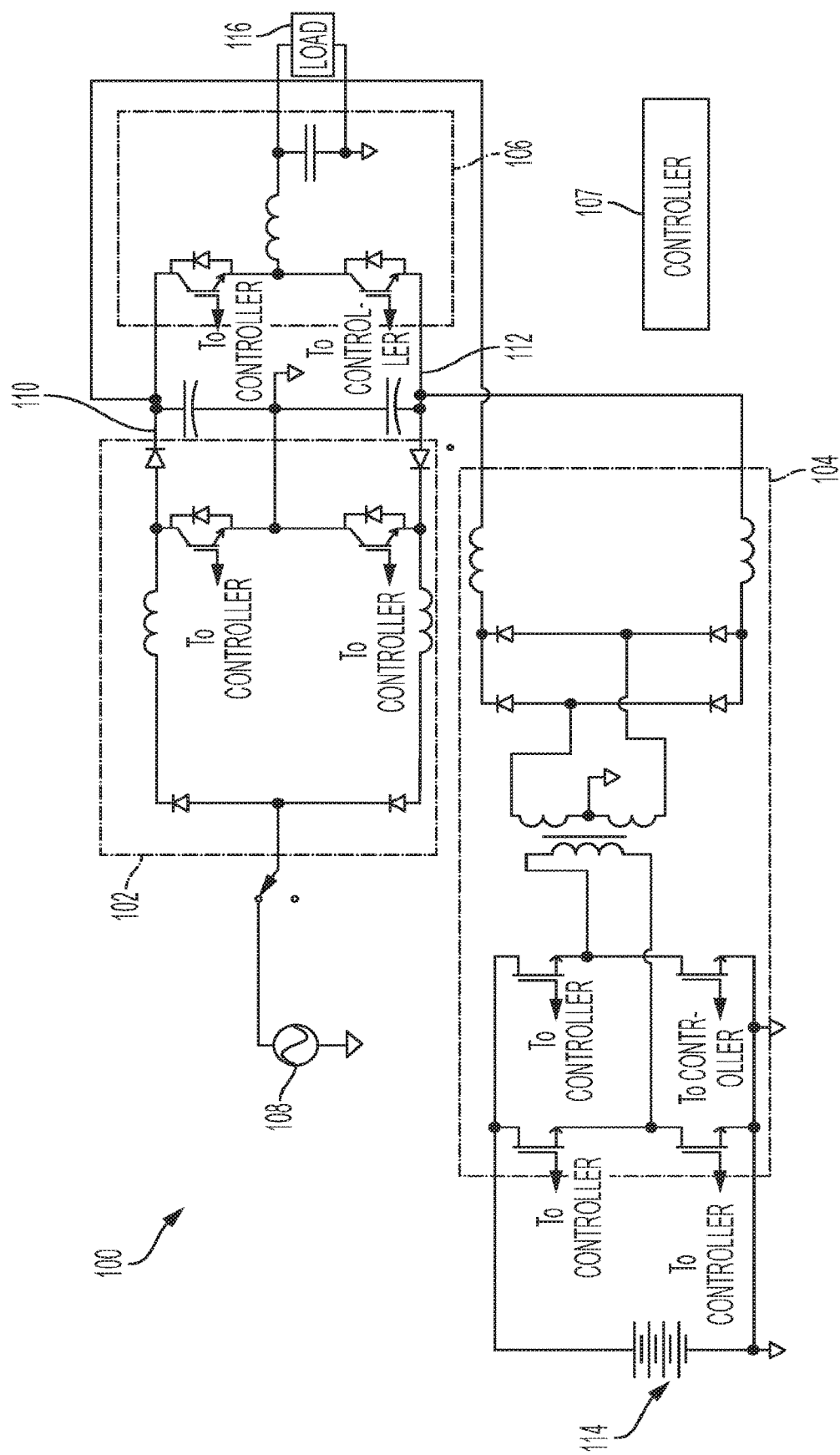
FIG. 1 illustrates a circuit diagram of a conventional online UPS.

As discussed above, certain UPSs, including online UPSs, can include multiple power conversation stages. For example, a conventional online UPS may include an input PFC converter and a separate DC/DC converter coupled to an energy storage device to convert the input AC power and stored DC power, respectively. FIG. 1 illustrates a circuit diagram of a conventional online UPS 100 including multiple input power conversion stages. The online UPS 100 includes a PFC converter 102, a DC/DC converter 104, an inverter 106, and a controller 107. An input of the PFC converter 102 is configured to be coupled to an AC power source 108 and an output of the PFC converter 102 is coupled to the inverter 106 via a first DC bus 110 and a second DC bus 112. The DC/DC converter 104 is configured to be coupled to an energy storage device 114 and is coupled to the inverter 106 via the first DC bus 110 and the second DC bus 112. The inverter 106 is configured to be coupled to, and provide output power to, a load 116. The controller 107 is communicatively coupled to, and may provide control signals to, one or more switching devices (for example, transistors) in the UPS 100.

Responsive to receiving input AC power from the AC power source 106, the PFC converter 102 is configured to convert the received AC power to DC power and provide the DC power to the inverter 106 via the first DC bus 110 and the second DC bus 112. If the energy storage device 114 is not fully charged, then the PFC converter 102 may also provide a portion of the DC power to the DC/DC converter 104 to charge the energy storage device 114 via the first DC bus 110 and the second DC bus 112.

Responsive to the AC power source 106 being unable to provide sufficient AC power to the PFC converter 102 (for example, due to a blackout or brownout condition), the DC/DC converter 104 may be configured to enter a backup mode of operation. In the backup mode of operation, the DC/DC converter 104 may be configured to draw backup DC power from the energy storage device 114, convert the backup DC power to converted DC power (for example, by changing a voltage level of the energy stored in the energy storage device 114), and provide the converted DC power to the inverter 106 via the first DC bus 110 and the second DC bus 112. The inverter 106 is configured to convert DC power from the first DC bus 110 and the second DC bus 112 (derived from at least one of the input AC power or the backup DC power as described above) into output AC power and the output AC power is provided to the load 116.

A size, component count, and cost of the conventional online UPS 100 may be disadvantageously high, for example, in part due to the PFC converter 102 and the DC/DC converter 104 being implemented as separate converters. The PFC converter 102 may be inactive when the DC/DC converter 104 is active, and the DC/DC converter 104 may be inactive when the PFC converter 102 is active. Thus, it may be beneficial to provide a single converter topology capable of performing functions of the PFC converter 102 and the DC/DC converter 104 without extended periods of inactivity to reduce the size, component count, and cost of an online UPS in which such a converter would be implemented.

The conventional online UPS 100 may also be disadvantageous because the power provided to the first DC bus 110 and the second DC bus 112 typically is not independently controlled in the backup mode of operation. For example, power provided by the PFC converter 102 and the DC/DC converter 104 to the first DC bus 110 and the second DC bus 112 is provided in equal proportions, without regard for the demands of the load 116. This may result in inefficient operation of the conventional online UPS 100. For instance, the conventional online UPS 100 may be unable to efficiently provide power to a load requiring an uneven distribution of power from the busses 110, 112 in a backup mode of operation, such as a load requiring a half-wave rectified waveform drawn primarily from the first DC bus 110.

In view of the foregoing, the conventional online UPS 100 may be disadvantageously costly, large, and inflexible. Accordingly, aspects of the present disclosure provide a topology capable of addressing at least some of the foregoing deficiencies to reduce costs and improve efficiency of a UPS.

Figure 2:
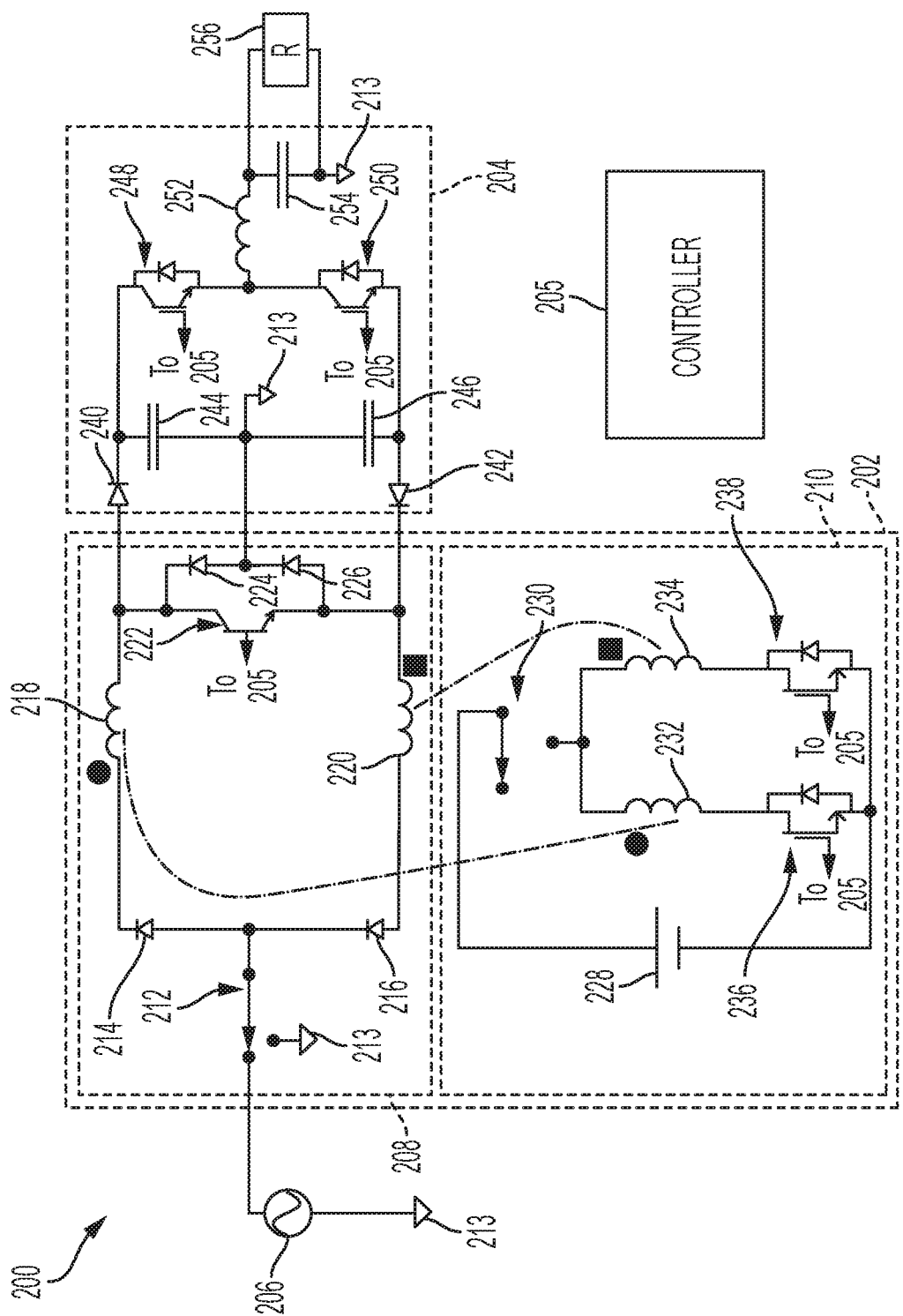
FIG. 2 illustrates a schematic diagram of a UPS according to an embodiment.

FIG. 2 illustrates a schematic diagram of a UPS 200 according to one embodiment described herein. The UPS 200 includes a dual converter 202, an inverter 204, and a controller 205. The dual converter 202 is configured to be coupled to an AC power source 206, and is coupled to the inverter 204. The inverter 204 is coupled to the dual converter 202, and may be configured to be coupled to a load.

The dual converter 202 includes a primary branch 208 and a backup branch 210. The primary branch 208 includes a first relay 212, a first diode 214, a second diode 216, a first inductor 218, a second inductor 220, a first switching device 222, a third diode 224, and a fourth diode 226. The backup branch 210 includes an energy storage device 228, a second relay 230, a third inductor 232, a fourth inductor 234, a second switching device 236, and a third switching device 238. In some examples, the energy storage device 228 may be external to the dual converter 202 and may be coupled to the backup branch 210. The inverter 204 may include a fifth diode 240, a sixth diode 242, a first capacitor 244, a second capacitor 246, a fourth switching device 248, a fifth switching device 250, a fifth inductor 252, and a third capacitor 254.

In some embodiments, other inverter topologies may be implemented in lieu of, or in addition to, the topology illustrated in connection with the inverter 204. In other embodiments, the inverter 204 may be omitted such that the UPS 200 provides DC, rather than AC, output power. In still other embodiments, the components 240-254 of the inverter 204 may be implemented as illustrated in FIG. 2, but the switching devices 248, 250 be operated to provide DC, rather than AC, output power. For example, only one of the switching devices 248, 250 may be closed and conducting while providing output power to the load 256, such that power having only one voltage polarity is provided to the load 256. Thus, although the components 240-254 are described in one example as being components of the inverter 204, the components 240-254 may be operated to provide either DC or AC output power as required or desired by the load 256. The inverter 204, or a circuit implemented in lieu of the inverter 204, may be referred to herein as an "output circuit."

In at least one embodiment, the first relay 212 is configured as a single-pole double-throw switching device having a first terminal, a second terminal, and a third terminal. The third terminal is configured to be switchably connected to one of the first terminal and the second terminal. The first terminal is configured to be coupled to the AC power source 206. The second terminal is coupled to a reference node 213 (for example, a node at a reference voltage such as a ground voltage). The third terminal is configured to be coupled to the first diode 214 and the second diode 216. The first diode 214 has an anode coupled to the first relay 212 and the second diode 216, and a cathode coupled to the first inductor 218. The second diode 216 has a cathode coupled to the first relay 212 and the first diode 214, and an anode coupled to the second inductor 220.

The first inductor 218 is coupled to the first diode 214 at a first connection, and is coupled to the first switching device 222, the third diode 224, and the fifth diode 240 at a second connection. The first inductor 218 is further configured to be magnetically coupled to the third inductor 232. As used herein, "magnetically coupled" may refer to a relationship of at least two inductive components in which a magnetic field and/or a change in a magnetic field produced by a first inductive component induces a voltage across a second inductive component (for example, mutual inductance).

The second inductor 220 is coupled to the second diode 216 at a first connection, and is coupled to the first switching device 222, the fourth diode 226, and the sixth diode 242 at a second connection. The second inductor 220 is further configured to be magnetically coupled to the fourth inductor 234. The first switching device 222 is coupled to the first inductor 218, the third diode 224, and the fifth diode 240 at a first connection, is coupled to the second inductor 220, the fourth diode 226, and the sixth diode 242 at a second connection, and is configured to be communicatively coupled to the controller 205 at a control connection. The third diode 224 includes a cathode connection coupled to the first inductor 218, the first switching device 222, and the fifth diode 240, and an anode connection coupled to the fourth diode 226 and the reference node 213. The fourth diode 226 includes a cathode connection coupled to the third diode 224 and the reference node 213, and an anode connection coupled to the second inductor 220, the first switching device 222, and the sixth diode 242.

The energy storage device 228 is coupled to the second relay 230 at a first connection, and is coupled to the second switching device 236 and the third switching device 238 at a second connection. In at least one embodiment, the second relay 230 is configured as a single-pole single-throw switch having a first terminal, a second terminal, and a third terminal. The third terminal is configured to be switchably connected to one of the first terminal and the second terminal. The first terminal is configured to be coupled to the third inductor 232 and the fourth inductor 234. In an embodiment, the second terminal may not be permanently connected to any other component, and is configured to be switchably connected to the third terminal. Accordingly, in an embodiment, current does not pass through the second terminal. The third terminal is configured to be coupled to the energy storage device 228. In some examples, the energy storage device 228 may be coupled to a charger (not illustrated) configured to charge the energy storage device 228. For example, a charger may be coupled in parallel with the energy storage device 228.

The third inductor 232 is coupled to the second relay 230 at a first connection, and is coupled to the second switching device 236 at a second connection. The fourth inductor 234 is coupled to the second relay 230 at a first connection, and is coupled to the third switching device 238 at a second connection. The second switching device 236 is coupled to the third inductor 232 at a first connection, is coupled to the energy storage device 228 at a second connection, and is configured to be communicatively coupled to the controller 205 at a control connection. The third switching device 238 is coupled to the fourth inductor 234 at a first connection, is coupled to the energy storage device 228 at a second connection, and is configured to be communicatively coupled to the controller 205 at a control connection.

The fifth diode 240 has an anode coupled to the first inductor 218, the first switching device 222, and the third diode 224, and a cathode coupled to the first capacitor 244 and the fourth switching device 248. The sixth diode 242 has a cathode coupled to the second inductor 220, the first switching device 222, and the fourth diode 226, and an anode coupled to the second capacitor 246 and the fifth switching device 250. The first capacitor 244 is coupled to the fifth diode 240 and the fourth switching device 248 at a first connection, and is coupled to the reference node 213 at a second connection. The second capacitor 246 is coupled to the reference node 213 at a first connection, and is coupled to the sixth diode 242 and the fifth switching device 250 at a second connection.

The fourth switching device 248 is coupled to the fifth diode 240 and the first capacitor 244 at a first connection, is coupled to the fifth switching device 250 and the fifth inductor 252 at a second connection, and is configured to be communicatively coupled to the controller 205 at a control connection. The fifth switching device 250 is coupled to the fourth switching device 248 and the fifth inductor 252 at a first connection, is coupled to the sixth diode 242 and the second capacitor 246 at a second connection, and is configured to be communicatively coupled to the controller 205 at a control connection.

The fifth inductor 252 is coupled to the fourth switching device 248 and the fifth switching device 250 at a first connection, and is configured to be coupled to the third capacitor 254 at a second connection. The third capacitor 254 is coupled to the fifth inductor 252 at a first connection, and is coupled to the reference node 213 at a second connection. In some examples, the third capacitor 254 may be configured to be coupled to a load external to the UPS 200. For example, the third capacitor 254 may be configured to be coupled in parallel with a load.

The dual converter 202 is configured to receive input power from at least one of the AC power source 206 and the energy storage device 228, convert the received power to DC power (for example, from AC power or DC power of a different voltage level), and provide the converted DC power to the inverter 204. The inverter 204 is configured to receive the DC power from the dual converter 202, convert the received DC power to output AC power, and provide the output AC power to a load. The controller 205 is configured to control the dual converter 202 and the inverter 204. For example, controlling operation of the dual converter 202 and the inverter 204 may include controlling a switching operation of the first switching device 222, the second switching device 236, the third switching device 238, the fourth switching device 248, and the fifth switching device 250.

The controller 205 may determine a mode of operation of the UPS 200 and, based on the mode of operation, control the dual converter 202 to draw power from at least one of the AC power source 206 or the energy storage device 228. For example, the controller 205 may determine a quality of power provided by the AC power source 206 based on one or more received parameters (for example, voltage, current, frequency, etc.) indicative of the quality of power provided by the AC power source 206. Determining a quality of power provided by the AC power source 206 may include, for example, determining if a parameter indicative of the power quality (for example, a voltage or current parameter) is within a permissible range.

If the parameter indicative of the power quality is within the permissible range, the controller 205 may determine that the UPS 200 is in a normal mode of operation characterized at least partially by the UPS 200 receiving acceptable-quality power from the AC power source 206. In the normal mode of operation, the controller 205 may control the dual converter 202 to draw power from the AC power source 206. If the parameter indicative of the power quality is outside of the permissible range, the controller 205 may determine that the UPS 200 is in a backup mode of operation characterized at least partially by the UPS 200 being unable to receive acceptable-quality power from the AC power source 206. In the backup mode of operation, the controller 205 may control the dual converter 202 to draw power from the energy storage device 228.

Figure 3:
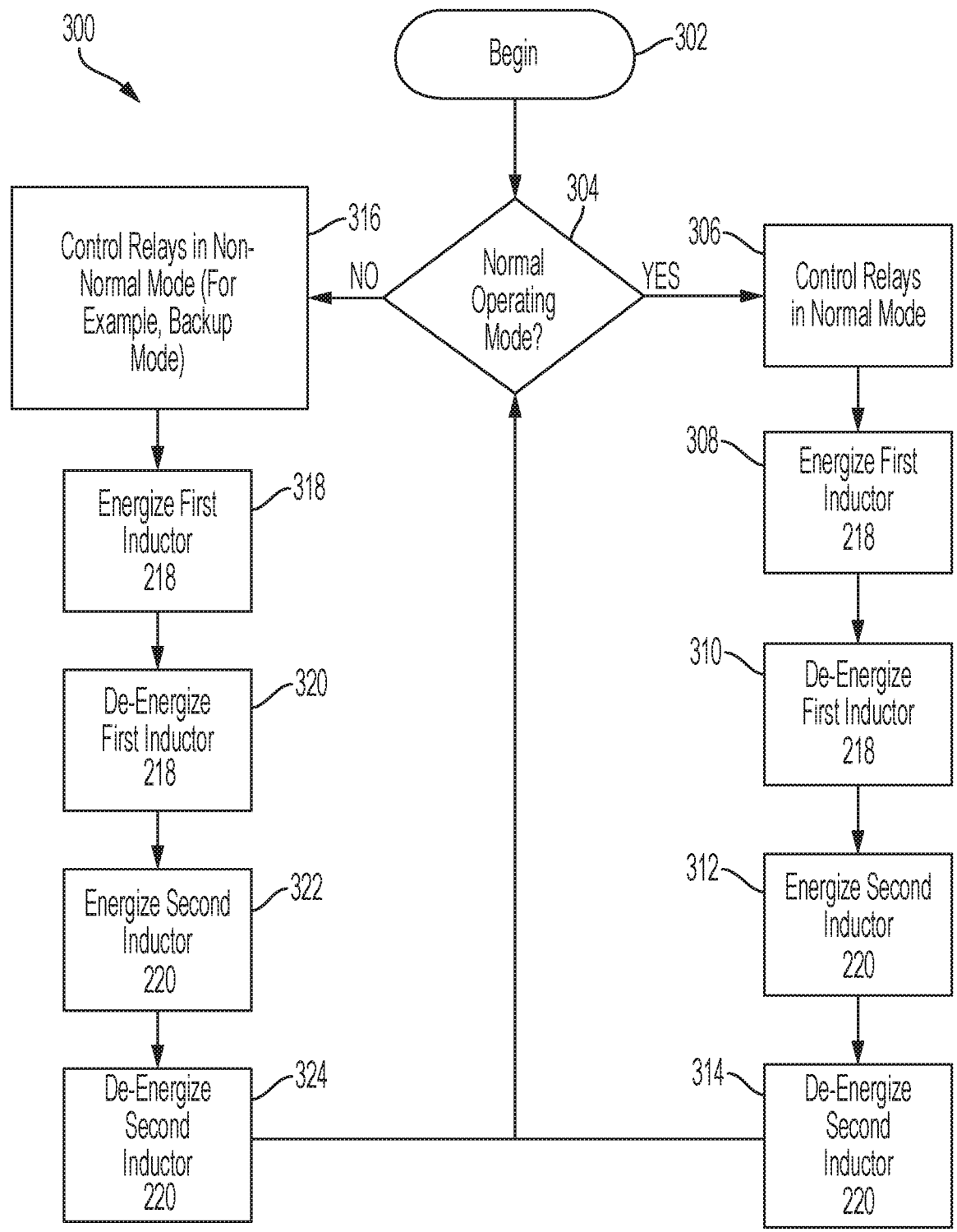
FIG. 3 illustrates a process of controlling the UPS according to an embodiment.

FIG. 3 illustrates a process 300 of controlling the UPS 200 according to an embodiment. At act 302, the process 300 begins. At act 304, a determination is made as to whether the UPS 200 is in a normal mode of operation. For example, as discussed above, the controller 205 may determine whether the UPS 200 is in the normal mode of operation based on one or more parameters indicative of a quality of power provided by the AC power source 206. If the controller 205 determines that the UPS 200 is in a normal mode of operation (304 YES), then the process 300 continues to act 306.

At act 306, the controller 205 controls the first relay 212 and the second relay 230. Controlling the first relay 212 includes connecting the third terminal of the first relay 212 to the first terminal of the first relay 212 such that the AC power source 206 is coupled to the first diode 214 and the second diode 216 via the first relay 212. Controlling the second relay 230 includes connecting the third terminal of the second relay 230 to the second terminal of the second relay 230 such that the energy storage device 228 is disconnected from the third inductor 232 and the fourth inductor 234.

At act 308, the first inductor 218 is energized. In one embodiment, the first inductor 218 is energized at act 308 by AC power received from the AC power source 206 where the AC power is in a positive half-cycle of a sinusoidal waveform. In one example, the first diode 214 is forward-biased and the second diode 216 is reverse-biased during a positive half-cycle of power provided by the AC power source 206. Energizing the first inductor 218 includes controlling, by the controller 205, the first switching device 222 to alternate between an open and non-conducting position and a closed and conducting position. The controller 205 may control the first switching device 222 in accordance with the power received from the AC power source 206. For example, the controller 205 may control the first switching device 222 to maintain a sinusoidal current through the first switching device 222 from the AC power source 206.

Figure 4:
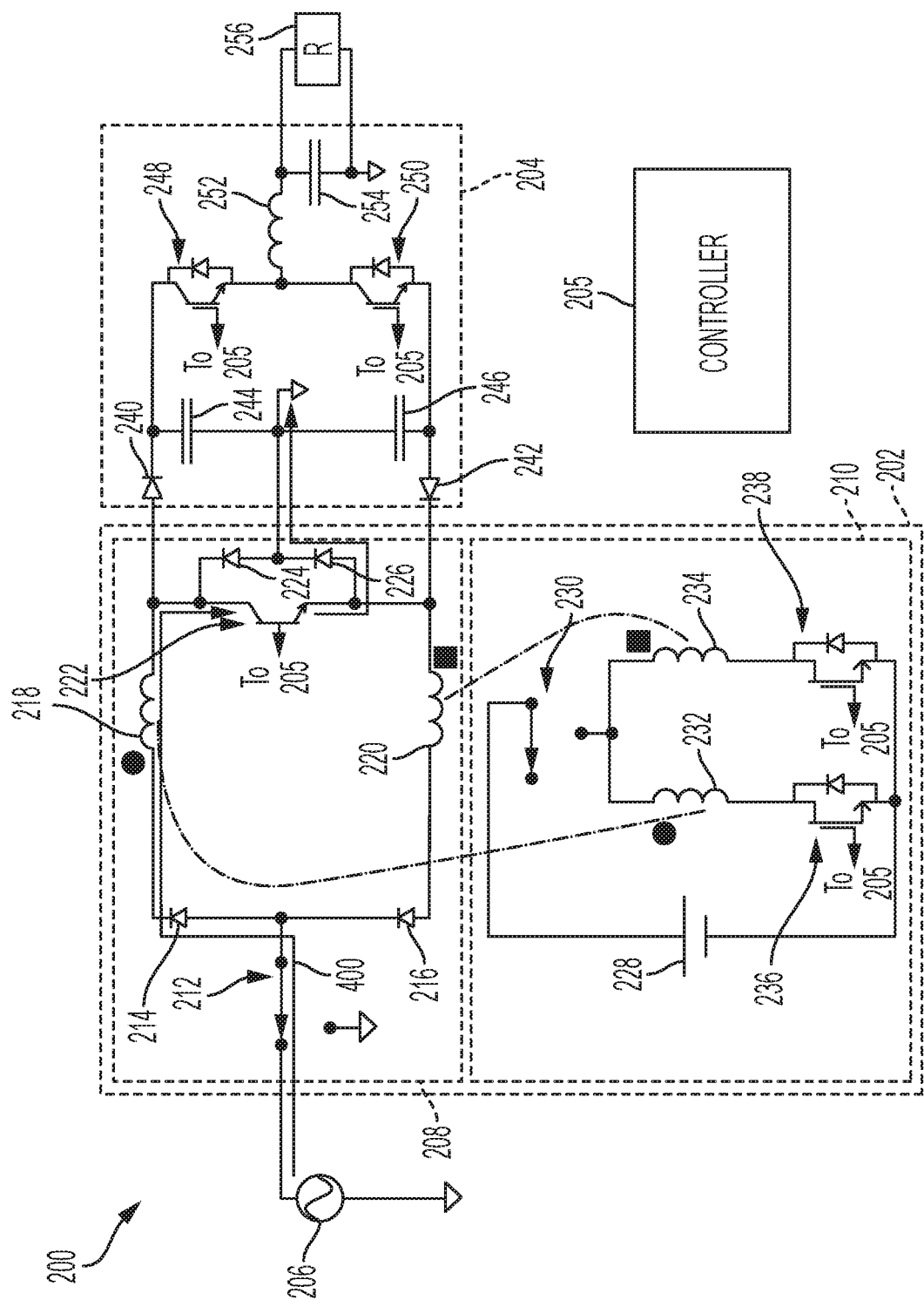
FIG. 4 illustrates a circuit diagram of the UPS including a first current path according to an embodiment.

When the first switching device 222 is in a closed and conducting position, AC power provided by the AC power source 206 is delivered to a conductive path including the AC power source 206, the first relay 212, the first diode 214, the first inductor 218, the first switching device 222, and the fourth diode 226. FIG. 4 illustrates a circuit diagram of the UPS 200 indicating a current path 400 at act 308.

Figure 5:
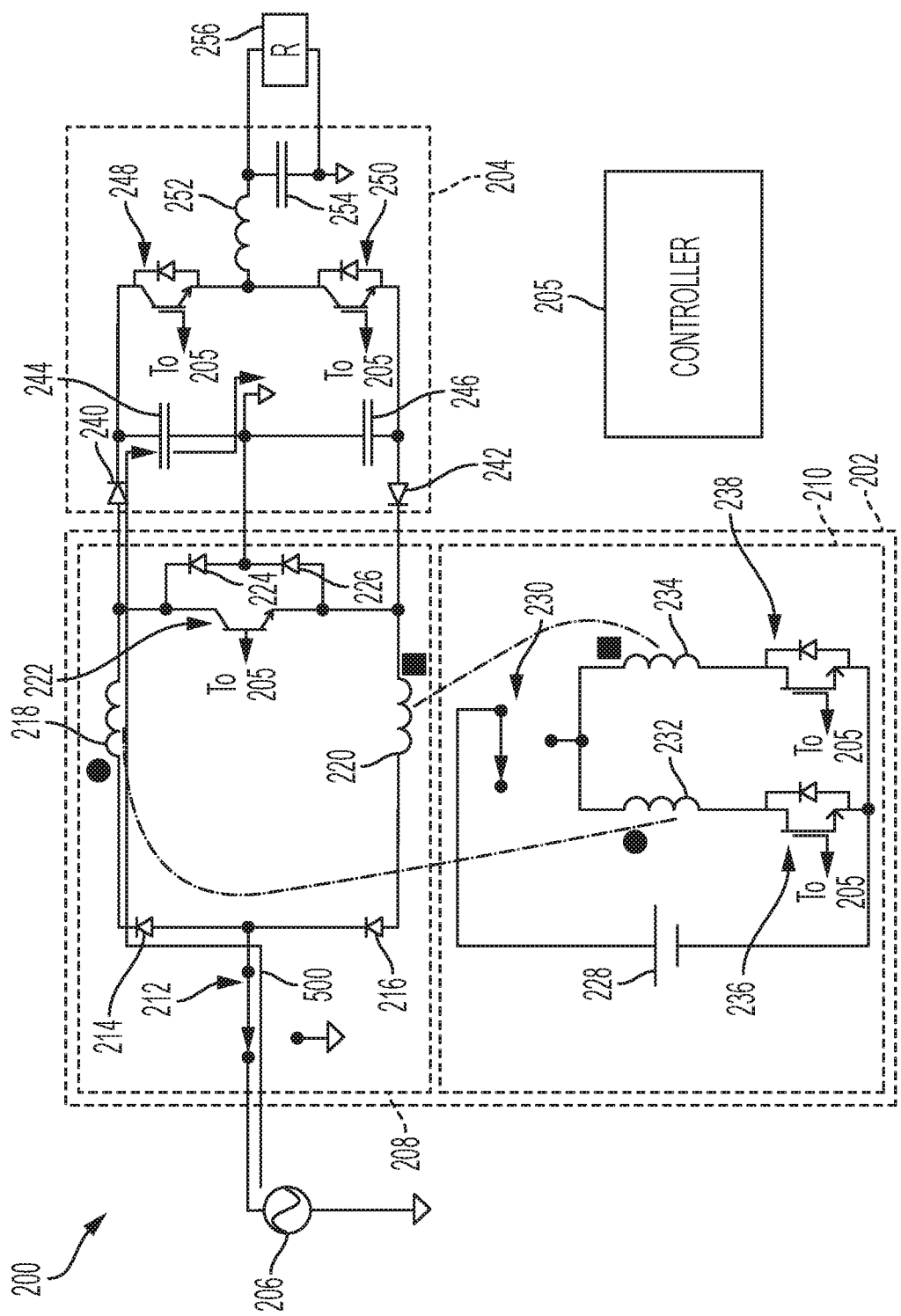
FIG. 5 illustrates a circuit diagram of the UPS including a second current path according to an embodiment.

At act 310, the first inductor 218 is de-energized. For example, act 310 includes controlling, by the controller 205, the first switching device 222 to transition from a closed and conducting position to an open and non-conducting position, thereby interrupting the current path 400. The first inductor 218 discharges to a conductive path including the AC power source 206, the first relay 212, the first diode 214, the first inductor 218, the fifth diode 240, and the first capacitor 244 to charge the first capacitor 244. FIG. 5 illustrates a circuit diagram of the UPS 200 indicating a current path 500 at act 310.

As discussed above, the first inductor 218 is magnetically coupled to the third inductor 232. However, during acts 308 and 310, the second switching device 236 is maintained in an open and non-conducting position. Accordingly, although a voltage is induced across the third inductor 232, no induced current passes through the third inductor 232 during acts 308 and 310 at least because the third inductor 232 is coupled in series with the open and non-conducting second switching device 236.

Figure 6:
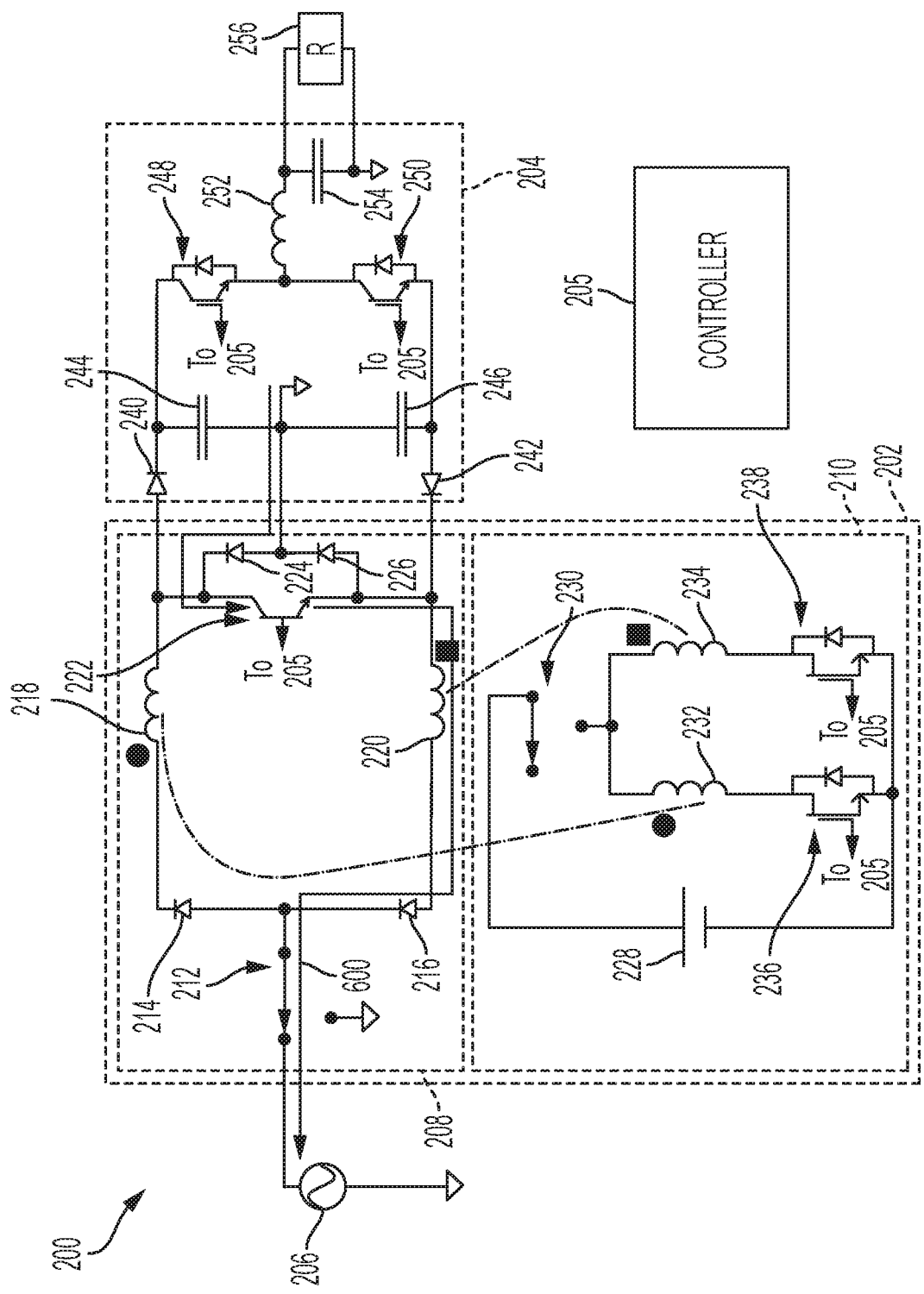
FIG. 6 illustrates a circuit diagram of the UPS including a third current path according to an embodiment.

At act 312, the second inductor 220 is energized. In one embodiment, the second inductor 220 is energized at act 312 by power received from the AC power source 206 where the AC power provided by the AC power source 206 is in a negative half-cycle of the sinusoidal waveform. In one example, the first diode 214 is reverse-biased and the second diode 216 is forward-biased during a negative half-cycle of power provided by the AC power source 206. Energizing the second inductor 220 may include controlling, by the controller 205, the first switching device 222 to be in a closed and conducting position such that power provided by the AC power source 206 is delivered to a conductive path including the AC power source 206, the second diode 216, the second inductor 220, the first switching device 222, and the third diode 224. Controlling the first switching device 222 at act 312 may be executed similarly to controlling the first switching device 222 as discussed above with respect to act 308. FIG. 6 illustrates a circuit diagram of the UPS 200 indicating a current path 600 at act 312.

Figure 7:
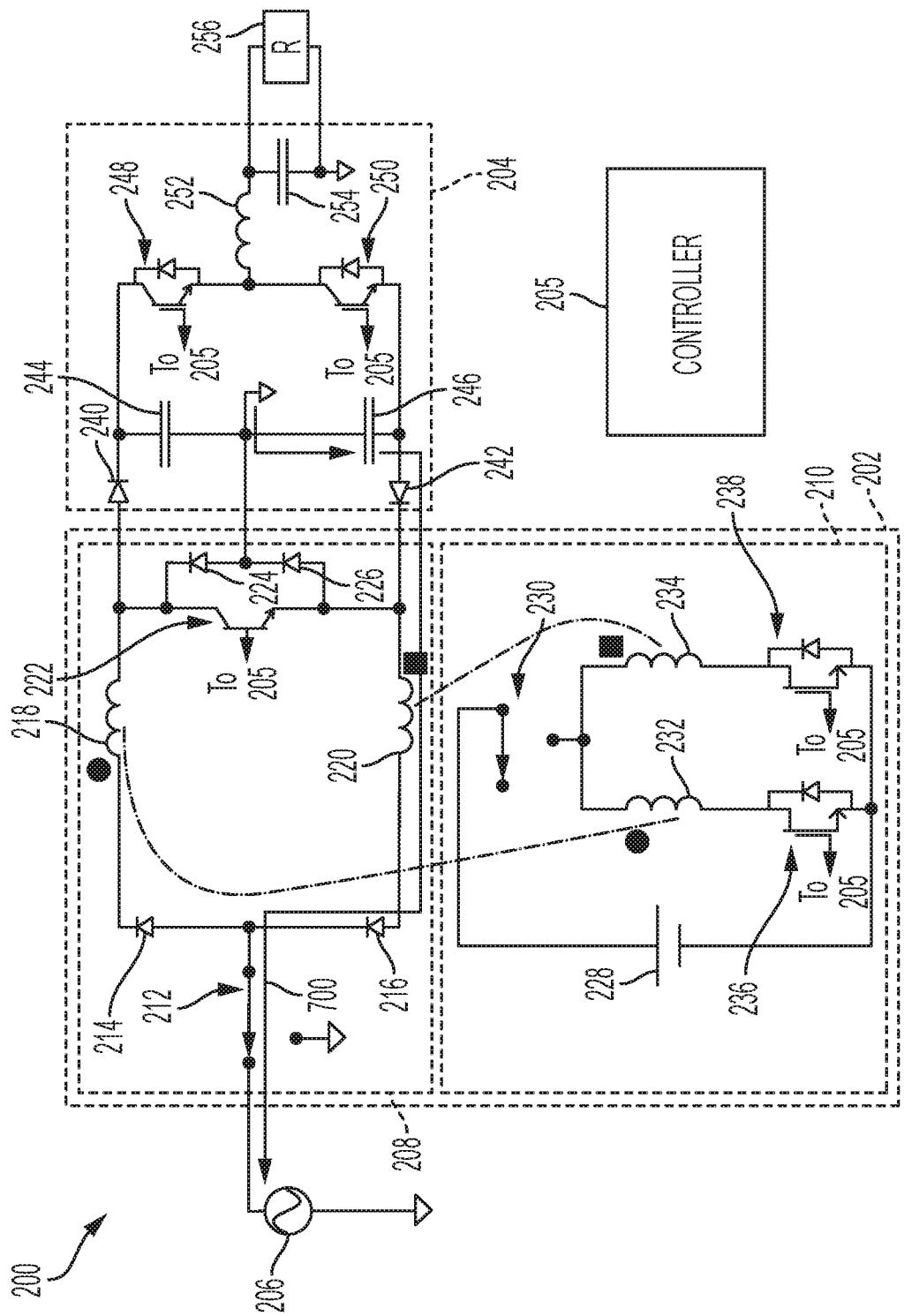
FIG. 7 illustrates a circuit diagram of the UPS including a fourth current path according to an embodiment.

At act 314, the second inductor 220 is de-energized. For example, act 314 includes controlling, by the controller 205, the first switching device 222 to transition from a closed and conducting position to an open and non-conducting position, thereby interrupting the current path 600. The second inductor 220 discharges to a conductive path including the AC power source 206, the first relay 212, the second diode 216, the second inductor 220, the sixth diode 242, and the second capacitor 246 to charge the second capacitor 246. FIG. 7 illustrates a circuit diagram of the UPS 200 indicating a current path 700 at act 314.

As discussed above, the second inductor 220 is magnetically coupled to the fourth inductor 234. However, during acts 312 and 314, the third switching device 238 is maintained in an open and non-conducting position. Accordingly, although a voltage is induced across the fourth inductor 234, no induced current passes through the fourth inductor 234 during acts 312 and 314 at least because the fourth inductor 234 is coupled in series with the open and non-conducting third switching device 238.

Accordingly, acts 308 and 310 are executed during a positive half-cycle of input power received from the AC power source 206 to charge the first capacitor 244, and acts 312 and 314 are executed during a negative half-cycle of input power received from the AC power source 206 to charge the second capacitor 246. The inverter 204 may be controlled during execution of acts 308-314 to draw power from the first capacitor 244 and the second capacitor 246, convert the power to AC power, and provide the AC power to an output. For example, the controller 205 may use Pulse Width Modulation (PWM) in connection with control signals provided to the switches 248, 250 to provide the AC power to the output. After act 314, the process 300 returns to act 304.

Responsive to determining that the UPS 200 is still in the normal mode of operation (304 YES), acts 306-314 are repeated. Responsive to determining that the UPS 200 is not in the normal mode of operation (304 NO), the process 300 continues to act 316. At act 316, the controller 205 controls the first relay 212 and the second relay 230. Controlling the first relay 212 may include connecting the third terminal of the first relay 212 to the second terminal of the first relay 212 such that the AC power source 206 is disconnected from the UPS 200, and the first diode 214 and the second diode 216 are coupled to the reference node 213. Controlling the second relay 230 may include connecting the third terminal of the second relay 230 to the first terminal of the second relay 230 such that the energy storage device 228 is connected to the third inductor 232 and the fourth inductor 234.

Figure 8:
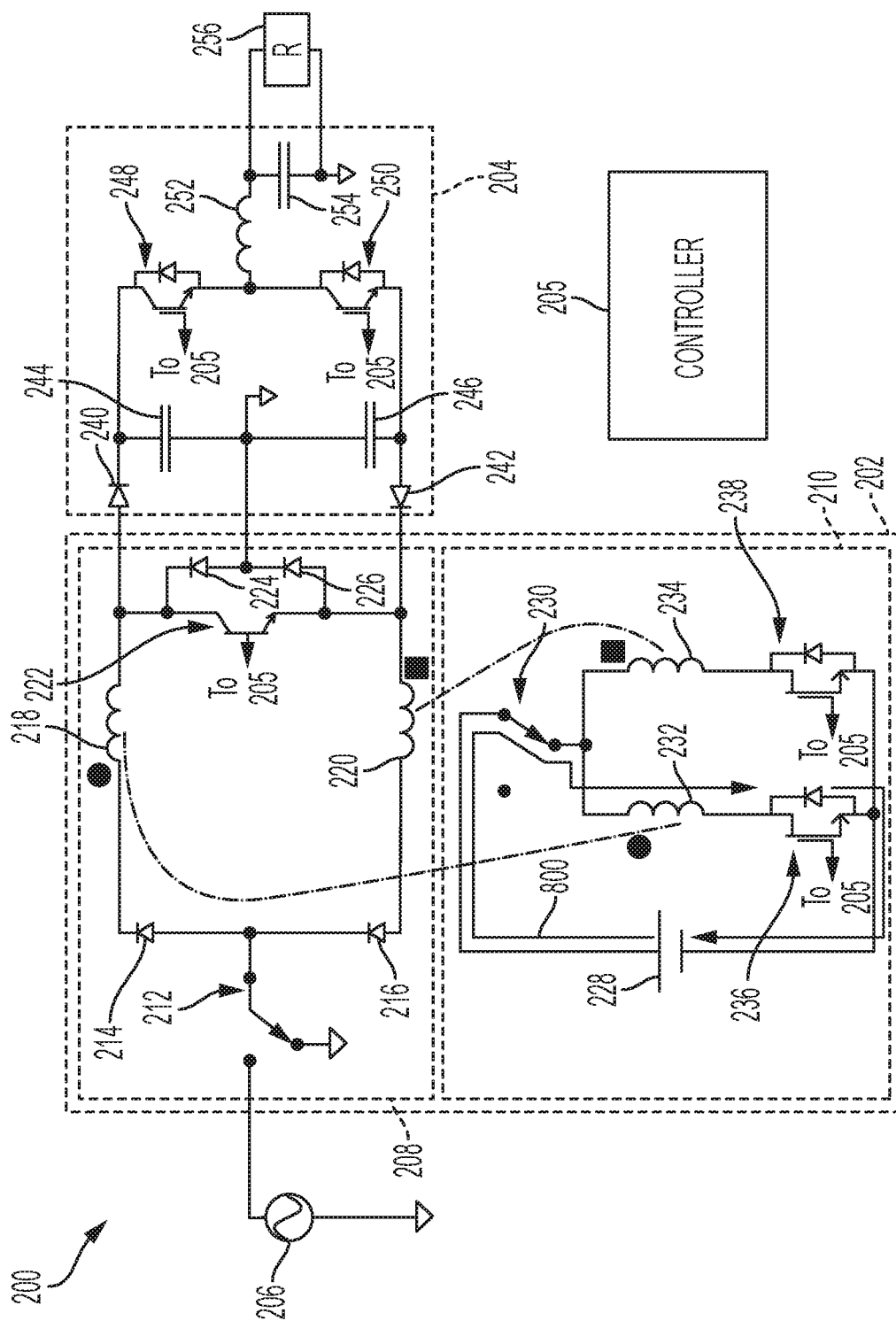
FIG. 8 illustrates a circuit diagram of the UPS including a fifth current path according to an embodiment.

At act 318, the first inductor is energized. For example, act 318 may include controlling, by the controller 205, the second switching device 236 to be in a closed and conducting position to energize the third inductor 232. Because the third inductor 232 is magnetically coupled to the first inductor 218, a voltage is induced across the first inductor 218, thereby energizing the magnetically coupled first inductor 218. Energizing the third inductor 232, and consequently the first inductor 218, may include providing, by the energy storage device 228, power to the third inductor 232 in a conductive path including the energy storage device 228, the second relay 230, the third inductor 232, and the second switching device 236. FIG. 8 illustrates a circuit diagram of the UPS 200 indicating a current path 800 at act 318.

Although the first inductor 218 is energized by the energization of the magnetically coupled third inductor 232, the first diode 214 prevents the first inductor 218 from discharging. The induced voltage across the first inductor 218 reverse-biases the first diode 214, which is coupled in series with the first inductor 218, thereby preventing any induced current from passing through the first inductor 218 during act 318.

At act 320, the first inductor is de-energized. For example, act 320 may include controlling, by the controller 205, the second switching device 236 to be in an open and non-conducting position, thereby preventing the energy storage device 228 from discharging to the third inductor 232. Responsive to the cessation of current through the third inductor 232, the polarity of the induced voltage across the first inductor 218 is reversed, thereby forward-biasing the first diode 214.

Figure 9:
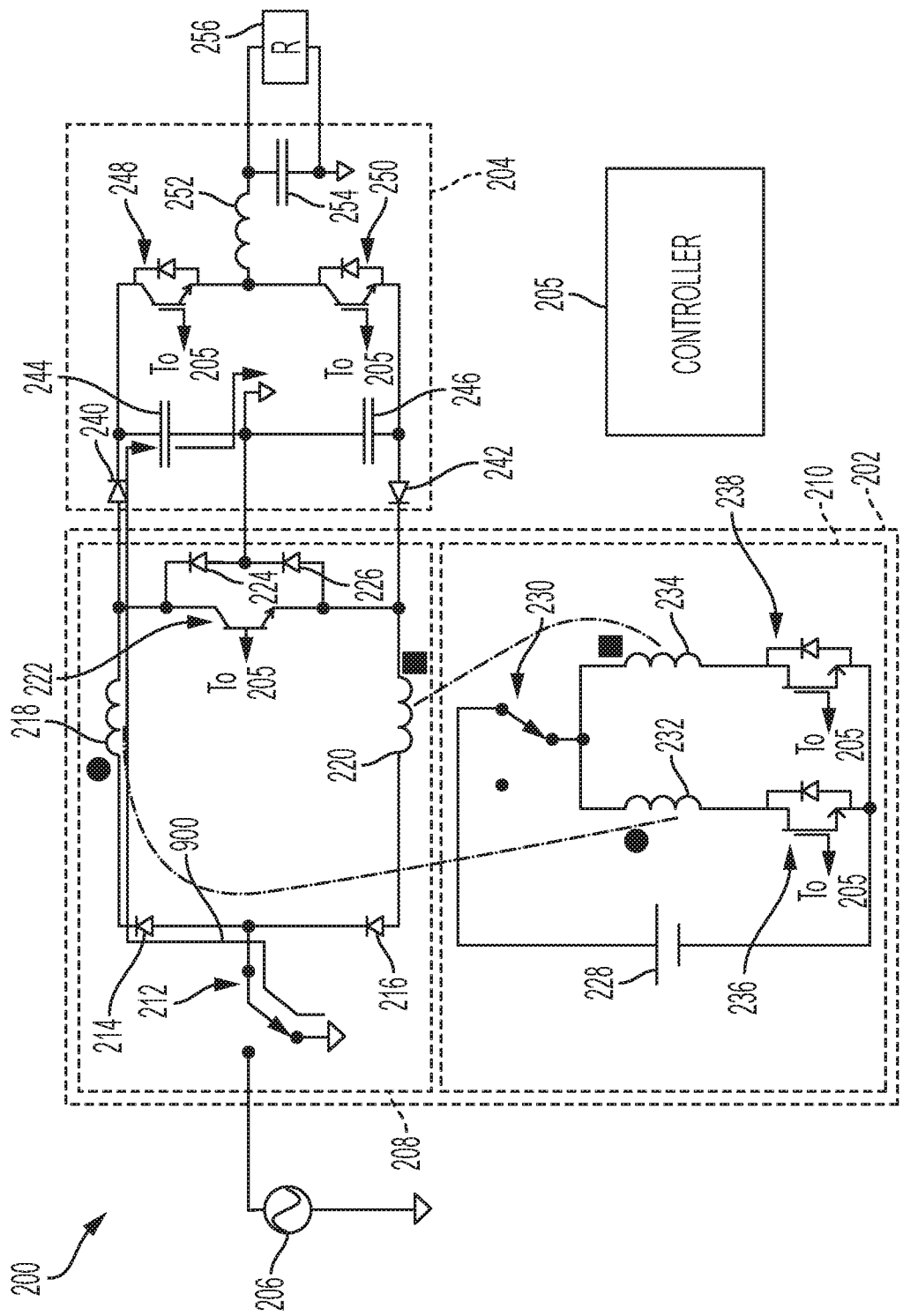
FIG. 9 illustrates a circuit diagram of the UPS including a sixth current path according to an embodiment.

The first inductor 218 is therefore able to discharge current to a conductive path including the first relay 212, the first diode 214, the first inductor 218, the fifth diode 240, and the first capacitor 244 to charge the first capacitor 244. FIG. 9 illustrates a circuit diagram of the UPS 200 indicating a current path 900 at act 320.

At act 322, the second inductor is energized. For example, act 322 may include controlling, by the controller 205, the third switching device 238 to be in a closed and conducting position to energize the fourth inductor 234. Because the fourth inductor 234 is magnetically coupled to the second inductor 220, a voltage is induced across the second inductor 220, thereby energizing the magnetically coupled second inductor 220.

Figure 10:
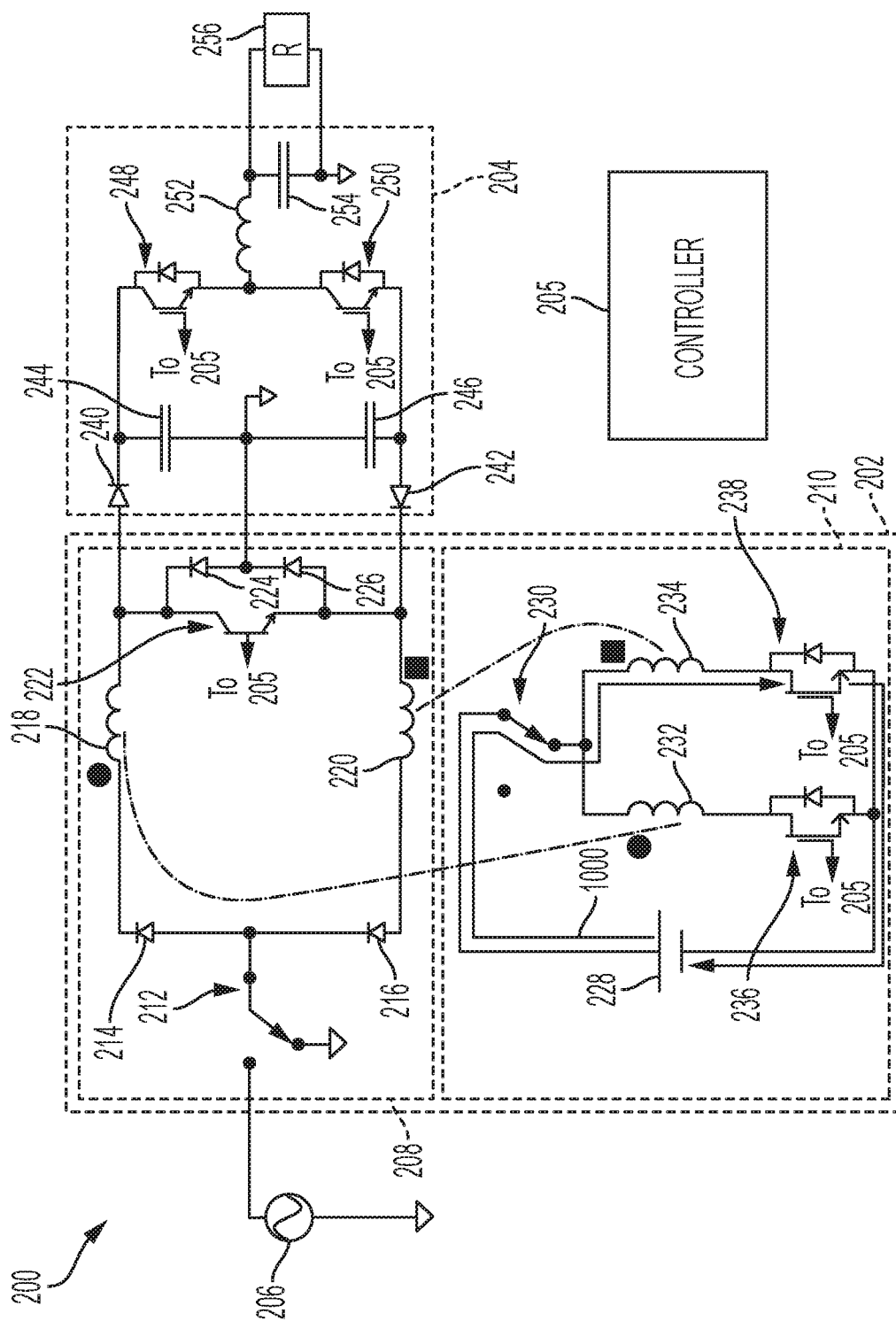
FIG. 10 illustrates a circuit diagram of the UPS including a seventh current path according to an embodiment.

Energizing the fourth inductor 234, and consequently the second inductor 220, may include providing, by the energy storage device 228, power to the fourth inductor 234 in a conductive path including the energy storage device 228, the second relay 230, the fourth inductor 234, and the third switching device 238. FIG. 10 illustrates a circuit diagram of the UPS 200 indicating a current path 1000 at act 322.

Although the second inductor 220 is energized by the energization of the magnetically coupled fourth inductor 234, the second diode 216 prevents the second inductor 220 from discharging. The induced voltage across the second inductor 220 reverse-biases the second diode 216, which is coupled in series with the second inductor 220, thereby preventing any induced current from passing through the second inductor 220 during act 322.

At act 324, the second inductor is de-energized. For example, act 324 may include controlling, by the controller 205, the third switching device 238 to be in an open and non-conducting position, thereby preventing the energy storage device 228 from discharging to the fourth inductor 234. Responsive to the cessation of current through the fourth inductor 234, the polarity of the induced voltage across the second inductor 220 is reversed, thereby forward-biasing the second diode 216.

Figure 11:
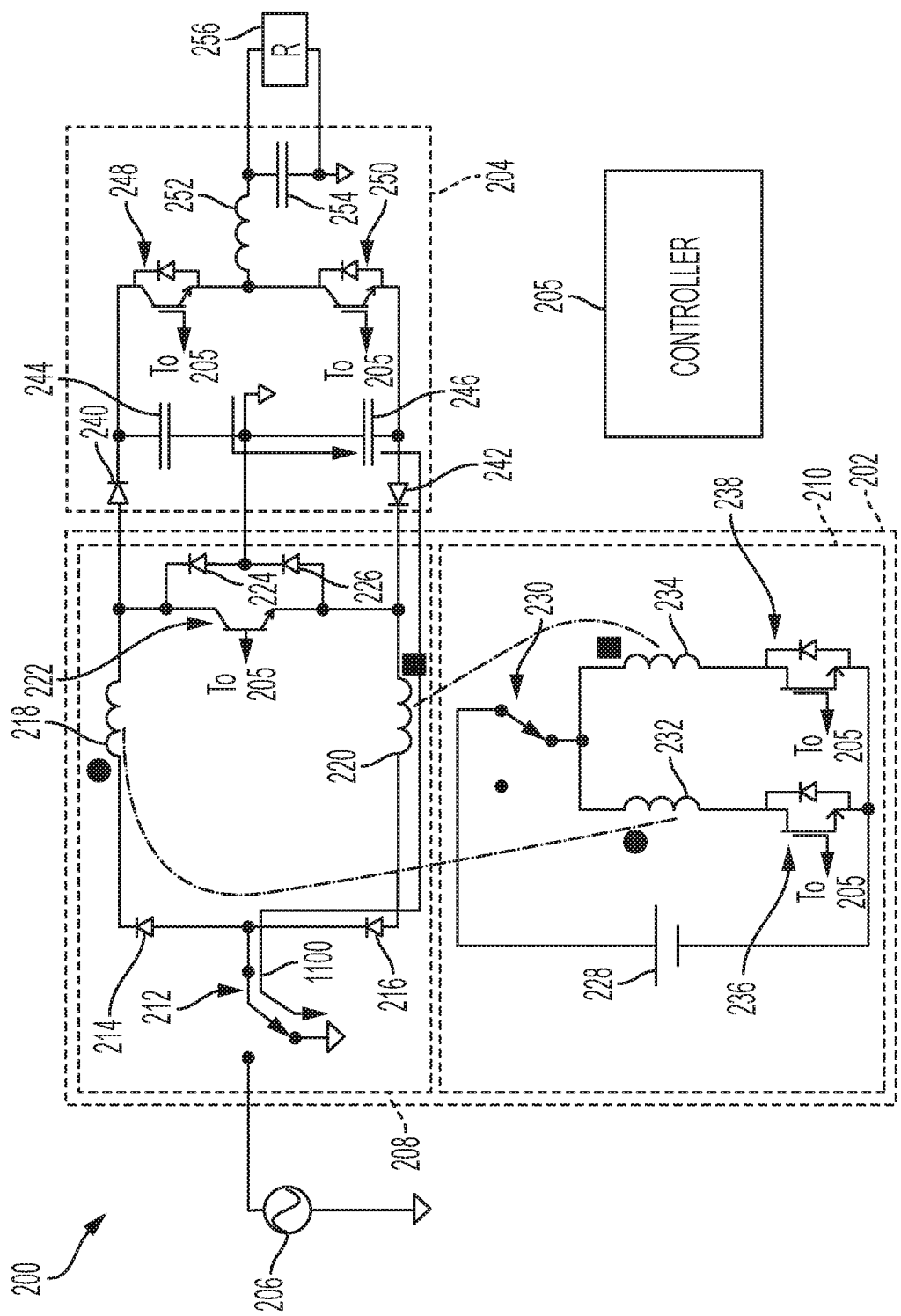
FIG. 11 illustrates a circuit diagram of the UPS including an eighth current path according to an embodiment.

The second inductor 220 is therefore able to discharge current to a conductive path including the first relay 212, the second diode 216, the second inductor 220, the sixth diode 242, and the second capacitor 246 to charge the second capacitor 246. FIG. 11 illustrates a circuit diagram of the UPS 200 indicating a current path 1100 at act 324.

Accordingly, acts 318 and 320 are executed to provide input power from the energy storage device 228 to charge the first capacitor 244, and acts 322 and 324 are executed to provide input power from the energy storage device 228 to charge the second capacitor 246. The inverter 204 may be controlled during execution of acts 318-324 to draw power from the first capacitor 244 and the second capacitor 246, convert the power to AC power, and provide the AC power to an output. For example, the controller 205 may use Pulse Width Modulation (PWM) in connection with control signals provided to the switches 248, 250 to provide the AC power to the output. After act 324, the process 300 returns to act 304.

Accordingly, process 300 may be executed by the UPS 200 to provide output power to a load during a normal mode of operation (for example, when the quality of AC power received from the AC power source 206 is acceptable) and during a backup mode of operation (for example, when the quality of AC power received from the AC power source 206 is not acceptable). As discussed above, the UPS 200 may be advantageous relative to certain UPSs, such as the conventional online UPS 100, at least because a component count of the UPS 200 is reduced relative to the conventional online UPS 100. The cost and physical footprint of the UPS 200 may therefore be reduced relative to the conventional online UPS 100.

In at least one embodiment, the primary branch 208 may be galvanically isolated from the backup branch 210. As used herein, "galvanically isolated" may refer to a relationship between at least two components in which no direct current path exists between the at least two components. For example, the primary branch 208 may be magnetically coupled to the backup branch 210 via the first inductor 218, the second inductor 220, the third inductor 232, and the fourth inductor 234, but does not have a direct current path via a physical conductive medium, such as a wire, bus, or other solid conductor. Moreover, the primary branch 208 and the backup branch 210 may not share a common ground or return connection. Accordingly, the primary branch 208 may be referred to herein as being galvanically isolated from the backup branch 210.

Moreover, a respective amount of power provided to the first capacitor 244 and the second capacitor 246 may be individually controlled. For example, during the normal mode of operation, the amount of power provided to the first capacitor 244 at act 310 (for example, the amount of power provided during a positive half-cycle of the input AC power) may be proportional to an amount of energy provided to the first inductor 218 at act 308. The amount of energy provided to the first inductor 218 may in turn be proportional to a duration of controlling the first switching device 222 to be in a closed and conducting position (for example, by controlling a duty cycle of a control signal provided to the first switching device 222 by the controller 205). Accordingly, an amount of power provided to the first capacitor 244 at act 310 may be individually controlled by the controller 205 at act 308.

Similar principles apply to the amount of power provided to the second capacitor 246 at acts 312 and 314. For example, during the normal mode of operation, the amount of power provided to the second capacitor 246 at act 314 (for example, the amount of power provided during a negative half-cycle of the input AC power) may be proportional to an amount of energy provided to the second inductor 220 at act 312. The amount of energy provided to the second inductor 220 may in turn be proportional to a duration of controlling the first switching device 222 to be in a closed and conducting position (for example, by controlling the duty cycle of the control signal provided to the first switching device 222 by the controller 205). Accordingly, an amount of power provided to the second capacitor 246 at act 314 may be controlled by the controller 205 at act 312.

In some embodiments, the first capacitor 244 and the second capacitor 246 may be individually charged and discharged. As used herein, "individual charging and discharging" may refer to charging or discharging one component without directly affecting, or being constrained by, another component. Accordingly, the first capacitor 244 may be charged or discharged at a first rate, and the second capacitor 246 may be charged or discharged at a second rate, where the first rate is independent of the second rate.

During the backup mode of operation, the amount of power provided to the first capacitor 244 at act 318 (for example, the amount of power provided by the energy storage device 228 to the first capacitor 244) may be proportional to an amount of energy provided to the first inductor 218 at act 318. The amount of energy provided to the first inductor 218 may in turn be proportional to a duration of controlling the second switching device 236 to be in a closed and conducting position (for example, by controlling a duty cycle of a control signal provided to the second switching device 236 by the controller 205), thereby energizing the third inductor 232. Accordingly, an amount of power provided to the first capacitor 244 at act 320 may be controlled by the controller 205 at act 318.

Similar principles apply to the amount of power provided to the second capacitor 246 at acts 322 and 324. For example, during the backup mode of operation, the amount of power provided to the second capacitor 246 at act 324 (for example, the amount of power provided by the energy storage device 228 to the second capacitor 246) may be proportional to an amount of energy provided to the second inductor 220 at act 322. The amount of energy provided to the second inductor 220 may in turn be proportional to a duration of controlling the third switching device 238 to be in a closed and conducting position (for example, by controlling a duty cycle of a control signal provided to the third switching device 238 by the controller 205). Accordingly, an amount of power provided to the second capacitor 246 at act 324 may be controlled by the controller 205 at act 322.

An amount of power provided to the first capacitor 244 and an amount of power provided to the second capacitor 246 may be individually controlled. Individual control of the amount of power provided to the first capacitor 244 and the second capacitor 246 may enable the UPS 200 to respond to load requirements more effectively. For example, if the UPS 200 provides power to a load requiring rectified power with a positive voltage, the UPS 200 may provide additional power to the first capacitor 244 to compensate for an increased amount of power being drawn from the first capacitor 244 by the inverter 206 to generate the rectified power.

Figure 12:
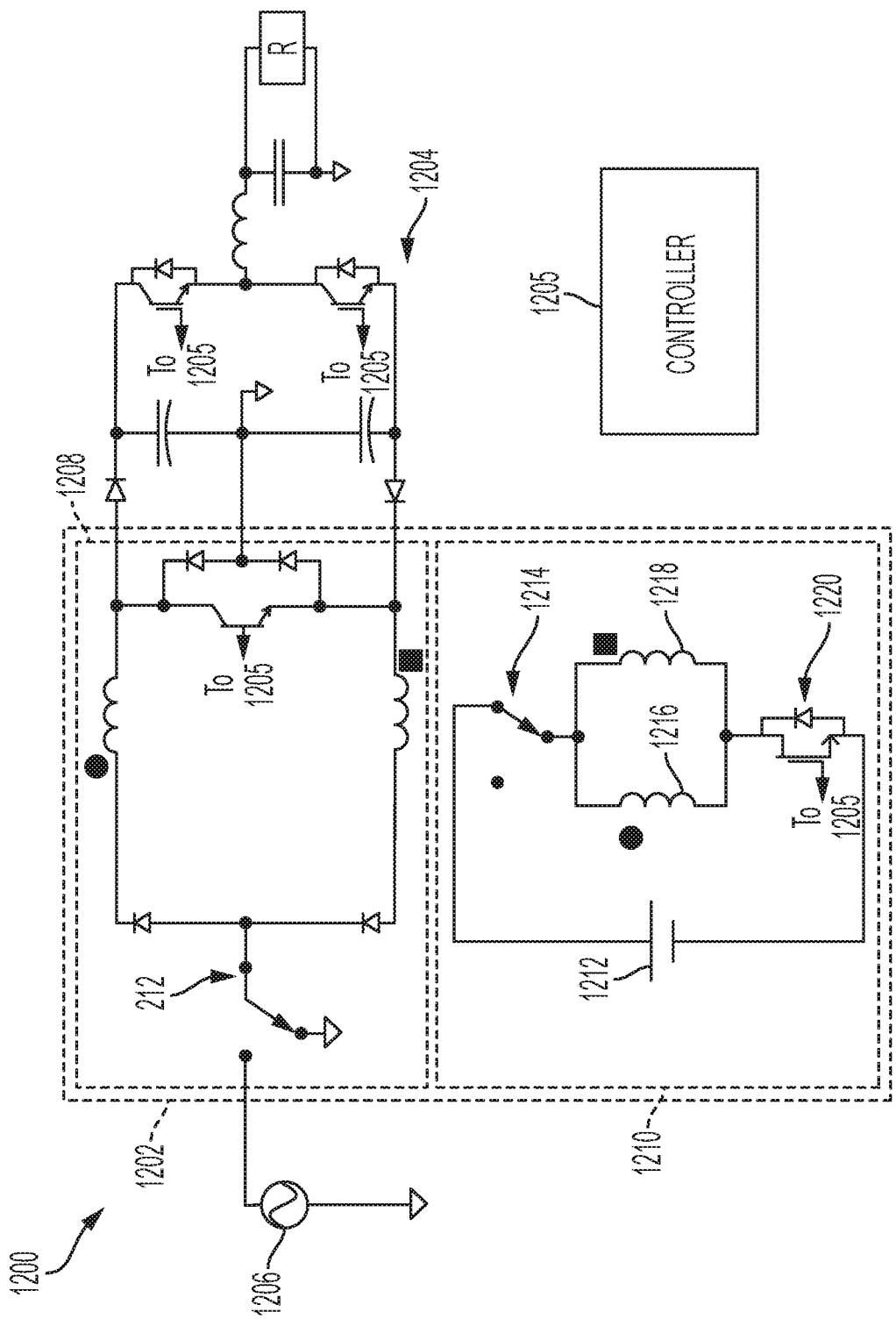
FIG. 12 illustrates a schematic diagram of a UPS according to an embodiment.

FIG. 12 illustrates a schematic diagram of a UPS 1200 according to an embodiment. The UPS 1200 includes a dual converter 1202, an inverter 1204, and a controller 1205. The dual converter 1202 is configured to be coupled to an AC input 1206, and is coupled to the inverter 1204. The inverter 1204 is coupled to the dual converter 1202, and may be configured to be coupled to a load. The dual converter 1202 includes a primary branch 1208 and a backup branch 1210.

The UPS 1200 is similar to the UPS 200. For example, the inverter 1204, the controller 1205, and the primary branch 1208 are similar to the inverter 204, the controller 205, and the primary branch 208. The backup branch 1210 is similar to the backup branch 210 with the second switching device 236 and the third switching device 238 of the backup branch 210 replaced by a single switching device in the backup branch 1210.

More specifically, the backup branch 1210 includes an energy storage device 1212, a relay 1214, a first inductor 1216, a second inductor 1218, and a switching device 1220. The energy storage device 1212 is coupled to the relay 1214 at a first connection, and is coupled to the switching device 1220 at a second connection. The relay 1214 is configured as a single-pole single-throw switch having a first terminal, a second terminal, and a third terminal. The third terminal is configured to be switchably connected to one of the first terminal and the second terminal. The first terminal is configured to be coupled to the first inductor 1216 and the second inductor 1218. In an embodiment, the second terminal may not be permanently connected to any other component, and is configured to be switchably connected to the third terminal. Accordingly, in an embodiment, current does not pass through the second terminal. The third terminal is configured to be coupled to the energy storage device 1212.

The first inductor 1216 is coupled to the relay 1214 at a first connection, and is coupled to the switching device 1220 at a second connection. The second inductor 1218 is coupled to the relay 1214 at a first connection, and is coupled to the switching device 1220 at a second connection. The switching device 1220 is coupled to the first inductor 1216 and the second inductor 1218 at a first connection, is coupled to the energy storage device 1212 at a second connection, and is configured to be communicatively coupled to the controller 1205 at a control connection.

In some examples, the UPS 200 and the UPS 1200 are configured to operate similarly. For example, the UPSs 200, 1200 may operate in a substantially similar fashion during a normal mode of operation. During a backup mode of operation, the first inductor 1216 and the second inductor 1218 are not independently energized because the first inductor 1216 and the second inductor 1218 are connected to the single, shared switching device 1220. In other words, the first inductor 1216 is not energized without energizing the second inductor 1218, and the second inductor 1218 is not energized without energizing the first inductor 1216.

In contrast, the third inductor 232 can be energized independently of the fourth inductor 234 by closing the second switching device 236 and opening the third switching device 238, and the fourth inductor 234 can be energized independently of the third inductor 232 by closing the third switching device 238 and opening the second switching device 236. However, a component count of the UPS 1200 is less than a component count of the UPS 200 at least because the number of switching devices is reduced by one, thereby reducing the cost and footprint of the UPS 1200 relative to the UPS 200.

Figure 13:
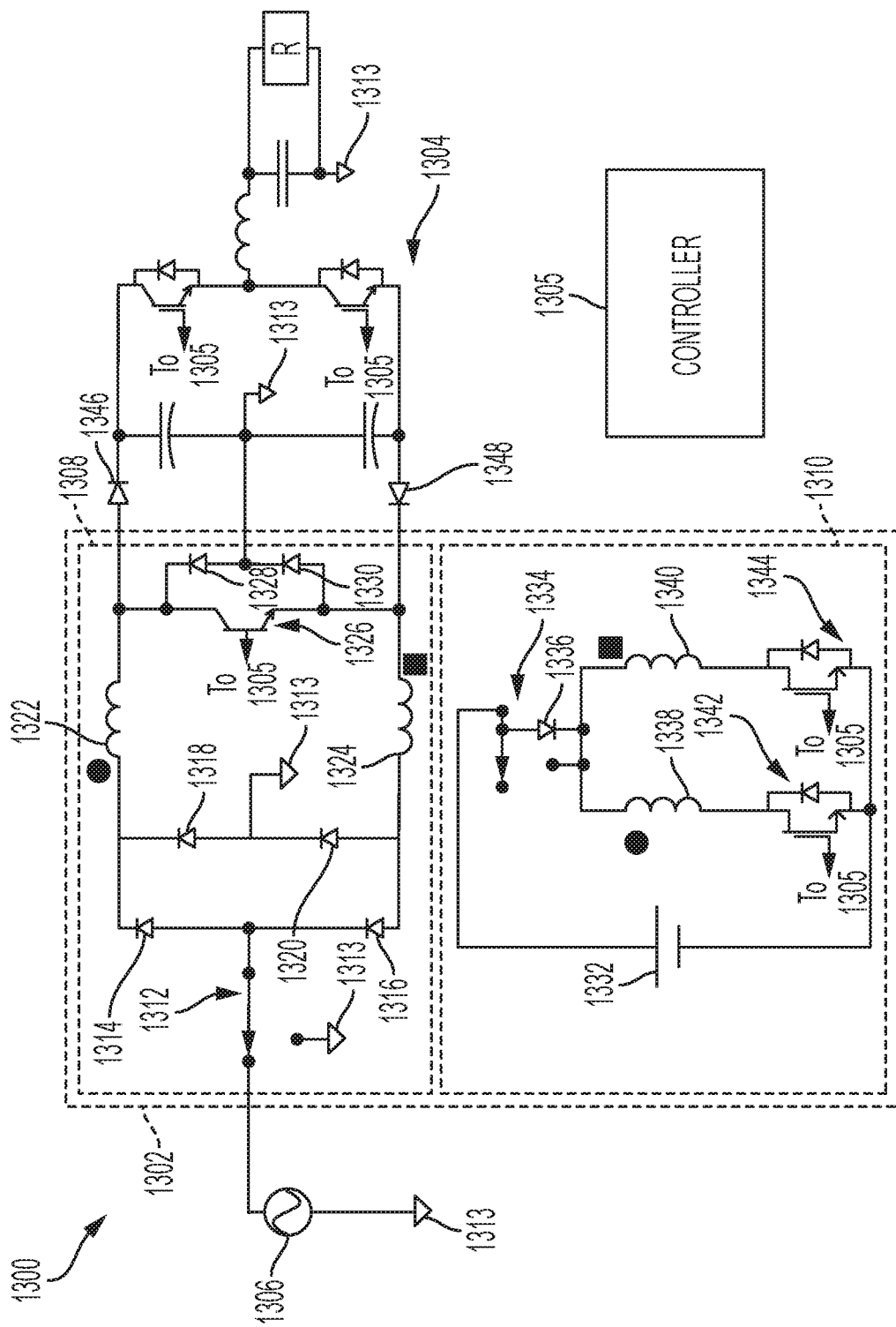
FIG. 13 illustrates a schematic diagram of a UPS according to an embodiment.

FIG. 13 illustrates a schematic diagram of a UPS 1300 according to an embodiment. The UPS 1300 includes a dual converter 1302, an inverter 1304, and a controller 1305. The dual converter 1302 is configured to be coupled to an AC input 1306, and is coupled to the inverter 1304. The inverter 1304 is coupled to the dual converter 1302, and may be configured to be coupled to a load. The dual converter 1302 includes a primary branch 1308 and a backup branch 1310.

The UPS 1300 is similar to the UPS 200. For example, the inverter 1304 and the controller 1305 are similar to the inverter 204 and the controller 205. The primary branch 1308 is similar to the primary branch 208 and has two additional diodes, and the backup branch 1310 is similar to the backup branch 210 and has an additional diode. More specifically, the primary branch 1308 includes a first relay 1312, a first diode 1314, a second diode 1316, a third diode 1318, a fourth diode 1320, a first inductor 1322, a second inductor 1324, a first switching device 1326, a fifth diode 1328, and a sixth diode 1330. The backup branch 1310 includes an energy storage device 1332, a second relay 1334, a seventh diode 1336, a third inductor 1338, a fourth inductor 1340, a second switching device 1342, and a third switching device 1344. In another embodiment, the primary branch 1308 may be replaced by an alternate topology, such as that of the primary branch 208. In yet another embodiment, the backup branch 1310 may be replaced by an alternate topology, such as that of the backup branch 210.

The first relay 1312 is configured as a single-pole double-throw switching device having a first terminal, a second terminal, and a third terminal. The third terminal is configured to be switchably connected to one of the first terminal and the second terminal. The first terminal is configured to be coupled to the AC input 1306. The second terminal is coupled to a reference node 1313 (for example, a node at a reference voltage such as a ground voltage). The third terminal is configured to be coupled to the first diode 1314 and the second diode 1316. The first diode 1314 has an anode coupled to the first relay 1312 and the second diode 1316, and a cathode coupled to the first inductor 1322 and the third diode 1318. The second diode 1316 has a cathode coupled to the first relay 1312 and the first diode 1314, and an anode coupled to the fourth diode 1320 and the second inductor 1324.

The third diode 1318 has a cathode coupled to the first diode 1314 and the first inductor 1322, and an anode coupled to the fourth diode 1320 and the reference node 1313. The fourth diode 1320 has a cathode coupled to the third diode 1318 and the reference node 1313, and an anode coupled to the second diode 1316 and the second inductor 1324. The first inductor 1322 is coupled to the first diode 1314 and the third diode 1318 at a first connection, and is coupled to the first switching device 1326, the fifth diode 1328, and an eighth diode 1346 of the inverter 1304 at a second connection. The first inductor 1322 is further configured to be magnetically coupled to the third inductor 1338 of the backup branch 1310.

The second inductor 1324 is coupled to the second diode 1316 and the fourth diode 1320 at a first connection, and is coupled to the first switching device 1326, the sixth diode 1330, and a ninth diode 1348 of the inverter 1304 at a second connection. The second inductor 1324 is further configured to be magnetically coupled to the fourth inductor 1340 of the backup branch 1310. The first switching device 1326 is coupled to the first inductor 1322, the fifth diode 1328, and the eighth diode 1346 at a first connection, is coupled to the second inductor 1324, the sixth diode 1330, and the ninth diode 1348 at a second connection, and is configured to be communicatively coupled to the controller 1305 at a control connection.

The fifth diode 1328 includes a cathode connection coupled to the first inductor 1322, the first switching device 1326, and the eighth diode 1346, and an anode connection coupled to the sixth diode 1330 and the reference node 1313. The sixth diode 1330 includes a cathode connection coupled to the fifth diode 1328 and the reference node 1313, and an anode connection coupled to the second inductor 1324, the first switching device 1326, and the ninth diode 1348.

The second relay 1334 is configured as a single-pole single-throw switching device having a first terminal, a second terminal, and a third terminal. The third terminal is configured to be switchably connected to one of the first terminal and the second terminal. The first terminal is configured to be coupled to the seventh diode 1336, the third inductor 1338, and the fourth inductor 1340. In an embodiment, the second terminal may not be permanently connected to any other component, and is configured to be switchably connected to the third terminal. Accordingly, in an embodiment, current does not pass through the second terminal. The third terminal is configured to be coupled to the energy storage device 1332 and to the seventh diode 1336.

The seventh diode 1336 includes an anode connection configured to be coupled to the third terminal of the second relay 1334, and a cathode connection configured to be coupled to the first terminal of the second relay 1334. The third inductor 1338 is coupled to the first terminal of the second relay 1334 at a first connection, and is coupled to the second switching device 1342 at a second connection. The third inductor 1338 is further configured to be magnetically coupled to the first inductor 1322. The second inductor 1340 is coupled to the first terminal of the second relay 1334 at a first connection, and is coupled to the third switching device 1344 at a second connection. The fourth inductor 1340 is further configured to be magnetically coupled to the second inductor 1324.

The second switching device 1342 is configured to be coupled to the third inductor 1338 at a first connection, is configured to be coupled to the energy storage device 1332 at a second connection, and is configured to be communicatively coupled to the controller 1305 at a control connection. The third switching device 1344 is configured to be coupled to the fourth inductor 1340 at a first connection, is configured to be coupled to the energy storage device 1332 at a second connection, and is configured to be communicatively coupled to the controller 1305 at a control connection. The energy storage device 1332 is coupled to the third terminal of the second relay 1334 at a first connection, and is coupled to the third inductor 1342 and the fourth inductor 1344 at a second connection.

As discussed above, the primary branch 1308 is similar to the backup branch 208 and includes the third diode 1318 and the fourth diode 1320. The third diode 1318 and the fourth diode 1320 provide power walk-in. Power walk-in may be advantageous where the UPS 1300 transitions from a backup mode of operation to a normal mode of operation. Subsequent to the transition from the backup mode of operation to the normal mode of operation, the UPS 1300 may resume drawing power from the AC input 1306. The UPS 1300 may draw a significant amount of current from the AC input 1306 upon being connected to the AC input 1306. Power walk-in refers to a feature of the UPS 1306 by which the current drawn from the AC input 1306 is more gradually increased when transitioning from the backup mode of operation to the normal mode of operation.

As discussed above, the third diode 1318 and the fourth diode 1320 are connected to the reference node 1313. The third diode 1318 and the fourth diode 1320 enable power walk-in by coupling components of the UPS 1300 (including, for example, at least one of the first diode 1314, the second diode 1316, the first inductor 1322, and the second inductor 1324) to the reference node 1313 via the third diode 1318 and the fourth diode 1320 while the UPS 1300 transitions from the backup mode of operation to the normal mode of operation. Because the components are coupled to the reference node 1313 during the transition, an amount of current drawn by the UPS 1300 from the AC source 1306 upon completion of the transition from the backup mode of operation to the normal mode of operation is reduced.

As discussed above, the backup branch 1310 is similar to the backup branch 210 and additionally includes the seventh diode 1336, having a cathode connection coupled to the first terminal of the second relay 1334, which is coupled to the third inductor 1338 and the fourth inductor 1340, and an anode connection coupled to the third terminal of the second relay 1334, which is coupled to the energy storage device 1332. The seventh diode 1336 enables a faster transition from a normal mode of operation to a backup mode of operation.

For example, in one embodiment, the UPS 1300 may transition from a normal mode of operation to the backup mode of operation. Accordingly, the controller 1305 may control the second relay 1334 to transition from connecting the third terminal to the second terminal (which may be a configuration of the second relay 1334 during the normal mode of operation) to connecting the third terminal to the first terminal (which may be a configuration of the second relay 1334 during the backup mode of operation). Before the second relay 1334 completes the transition, current from the energy storage device 1332 may be unable to pass from the third terminal of the second relay 1334 to the first terminal of the second relay 1334, because a conductive path through the second relay 1334 is not yet completed.

In one example, the seventh diode 1336 being connected in parallel with the second relay 1334 enables the energy storage device 1332 to discharge through a conductive path including the energy storage device 1332, the seventh diode 1336, and at least one of the third inductor 1338 and the second switching device 1342, or the fourth inductor 1340 and the third switching device 1344, while the second relay 1334 completes a transition from connecting the third terminal to the second terminal to connecting the third terminal to the first terminal. Stated differently, because the seventh diode 1336 is connected in parallel with the second relay 1334, the energy storage device 1332 is allowed to discharge through the seventh diode 1336 before the second relay 1334 is fully transitioned from a normal mode of operation configuration and a backup mode of operation configuration. Accordingly, the seventh diode 1336 enables the energy storage device 1332 to begin discharging quickly in a transition from a normal mode of operation to a backup mode of operation.

Figure 14:
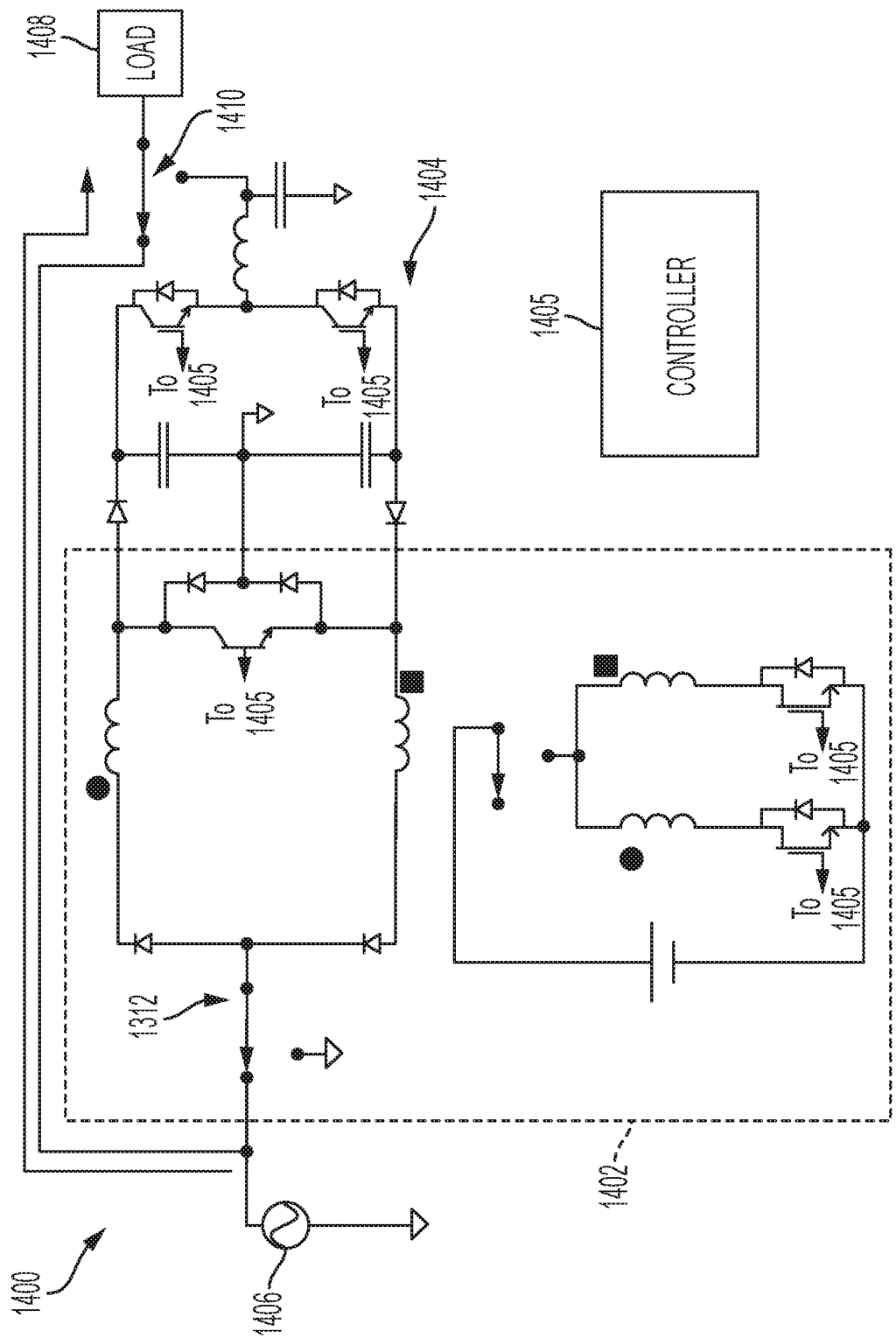
FIG. 14 illustrates a schematic diagram of a UPS according to an embodiment.

FIG. 14 illustrates a schematic diagram of a UPS 1400 according to an embodiment. The UPS 1400 includes a dual converter 1402, an inverter 1404, and a controller 1405. The dual converter 1402 is configured to be coupled to an AC input 1406, and is coupled to the inverter 1404. The inverter 1404 is coupled to the dual converter 1402, and is configured to be coupled to a load 1408.

The UPS 1400 is similar to the UPS 200. For example, the dual converter 1402, the inverter 1404, and the controller 1405 are similar to the dual converter 202, the inverter 204, and the controller 205. The UPS 1400 further includes a relay 1410 configured as a single-pole double-throw switching device having a first terminal, a second terminal, and a third terminal. The third terminal is configured to be switchably connected to one of the first terminal and the second terminal. The first terminal is configured to be coupled to the AC input 1406. The second terminal is coupled to the inverter 1404. The third terminal is configured to be coupled to the load 1408.

The relay 1410 is configured to enable a bypass mode of operation in addition to the backup mode of operation and the normal mode of operation. In the bypass mode of operation, the third terminal of the relay 1410 is coupled to the first terminal of the relay 1410 such that AC power provided by the AC input 1406 bypasses the dual converter 1402 and the inverter 1404. In the normal mode of operation or the backup mode of operation, the third terminal of the relay 1410 is coupled to the second terminal of the relay 1410 such that the AC input 1406 provides input power to the dual converter 1402 such that the UPS 1400 operates similarly to the UPS 200.

The controller 1405 may provide one or more control signals to the relay 1410 to control the switching position of the relay 1410. For example, the controller 1405 may select the bypass mode of operation, thereby controlling the relay 1410 to connect the third terminal of the relay 1410 to the first terminal of the relay 1410, responsive to determining that the AC power provided by the AC input 1406 is of a sufficiently high quality. Determining that the AC power is of the sufficiently high quality may include determining that a parameter of the AC power is within a threshold range.

For example, the controller 1405 may determine that the voltage of the AC power is within 1V of an ideal 120V sinusoidal waveform and that the AC power is therefore of a sufficiently high quality to provide directly to the load 1408. Otherwise, and continuing with the foregoing example, if the voltage of the AC power is not within 1V of an ideal 120V sinusoidal waveform, the controller 1405 may determine that the AC power should be processed by the dual converter 1402 and the inverter 1404 before being provided to the load 1408. Accordingly, the controller 1405 may control the relay 1410 to connect the third terminal of the relay 1410 to the second terminal and select one of the backup mode of operation or the normal mode of operation.

As discussed above, UPSs disclosed herein may be controlled by controllers including the controller 205, the controller 1205, the controller 1305, and the controller 1405. Using data stored in associated memory, the controllers may execute one or more instructions stored on one or more non-transitory computer-readable media that may result in manipulated data. In some examples, the controllers may include one or more processors or other types of controllers. In another example, the controllers include a Field-Programmable Gate Array (FPGA) controller.

In yet another example, the controllers perform a portion of the functions disclosed herein on a processor and performs another portion using an Application-Specific Integrated Circuit (ASIC) tailored to perform particular operations. As illustrated by these examples, examples in accordance with the present invention may perform the operations described herein using many specific combinations of hardware and software and the invention is not limited to any particular combination of hardware and software components.

As discussed above, the UPS 200 may receive power from the energy storage device 228, which may be internal to, or external to and coupled to, the UPS 200. In some embodiments, the energy storage device 228 may be coupled to an external charging device (not illustrated) configured to charge the energy storage device 228 with electrical energy. In alternate embodiments, the dual converter 202 may be configured to recharge the energy storage device 228 with energy derived from the AC power source 206.

For example, recharging the energy storage device 228 may include controlling the second relay 230 and at least one of the second switching device 236 and the third switching device 238 to provide a conductive path including the energy storage device 228, the second relay 230, and either one or both of the third inductor 232 and the second switching device 236, and the fourth inductor 234 and the third switching device 238. At least a portion of the power provided by the AC power source 206 may be provided to the energy storage device 228 to charge the energy storage device 228 via at least one of the first inductor 218 and the third inductor 232, and the second inductor 220 and the fourth inductor 234.

In one example, charging the energy storage device 228 may include controlling the second relay 230 to connect the third terminal of the second relay 230 to the first terminal of the second relay 230 and controlling the second switching device 236 to be in a closed and conducting position during a positive half-cycle of AC power provided by the AC power source 206. The first inductor 218 may be energized by the positive half-cycle of the AC power provided by the AC power source 206 and energize the magnetically coupled third inductor 232. The third inductor 232 may discharge induced current to the energy storage device 228 through a conductive path including the energy storage device 228, the second relay 230, the third inductor 232, and the second switching device 236, thereby charging the energy storage device 228.

In another example, charging the energy storage device 228 may include controlling the second relay 230 to connect the third terminal of the second relay 230 to the first terminal of the second relay 230 and controlling the third switching device 238 to be in a closed and conducting position during a negative half-cycle of AC power provided by the AC power source 206. The second inductor 220 may be energized by the negative half-cycle of the AC power provided by the AC power source 206 and energize the magnetically coupled fourth inductor 234. The fourth inductor 234 may discharge induced current to the energy storage device 228 through a conductive path including the energy storage device 228, the second relay 230, the fourth inductor 234, and the third switching device 238, thereby charging the energy storage device 228.

In light of the foregoing remarks, UPSs having reduced size and component counts with increased flexibility have been described herein. In one example, a UPS having a dual converter has been described. The dual converter includes components configured to operate during a backup mode of operation and a normal mode of operation, whereas certain conventional UPSs include a first set of components to operate during a backup mode of operation, and a second set of components to operate during a normal mode of operation. Furthermore, the dual converter is configured to control an amount of power provided to each individual DC bus capacitor, whereas certain conventional UPSs are only capable of providing an equal amount of power each DC bus capacitor. Accordingly, a component count may be reduced, thereby lowering a cost and physical size of the UPS, while increasing the flexibility of the UPS.

Although certain embodiments have illustrated a dual converter implemented in connection with a UPS, other exemplary converters may not be implemented in connection with a UPS. The dual converter may be implemented in any other environment or topology, and is not limited to examples including UPSs. For example, the dual converter may be implemented with a power device other than a UPS.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply (UPS) system including:
   a first input configured to be coupled to an input power source;
   a second input configured to be coupled to an energy storage device;
   an output configured to provide output power;

a power conversion circuit configured to convert power received from at least one of the input power source or the energy storage device, the power conversion circuit including:
   a primary branch portion having a first inductor and a third inductor, and
   a backup branch portion having
      a second inductor, the second inductor being magnetically coupled to, and galvanically isolated from, the first inductor, wherein the second inductor is coupled to a first switching device and
      a fourth inductor being magnetically coupled to the third inductor, where the fourth inductor is coupled to a second switching device;
an output circuit coupled to the power conversion circuit and to the output; and
a controller coupled to the power conversion circuit and to the output circuit, and configured to:
   control the power conversion circuit to provide, in a normal mode of operation, direct current (DC) power derived from the input power source to the output circuit via the first inductor;
   control the power conversion circuit to provide, in a backup mode of operation, DC power derived from the energy storage device to the output circuit via the first inductor and the second inductor;
   control the first switching device to induce a voltage across the first inductor and discharge the first inductor to charge a first capacitor; and
   control the second switching device to induce a voltage across the third inductor to provide a second charging current to charge a second capacitor.

2. The UPS system of claim 1, wherein the output circuit includes a first capacitor configured to be coupled to the power conversion circuit and a second capacitor configured to be coupled to the power conversion circuit.

3. The UPS system of claim 1, wherein the controller is further configured to control the first switching device to charge the first capacitor at a first rate and is configured to control the second switching device to charge the second capacitor at a second rate different than the first rate.

4. The UPS system of claim 1, wherein the controller is further configured to control the first switching device and the second switching device to charge the first capacitor simultaneously with the second capacitor.

5. The UPS system of claim 1, wherein controlling the first switching device to charge the first capacitor includes:
   controlling the first switching device to enable the energy storage device to provide current to the second inductor, wherein providing current to the second inductor includes inducing a voltage across the first inductor; and
   controlling the first switching device to disable the energy storage device from providing current to the second inductor,
   wherein the first inductor is configured to discharge the first charging current to the first capacitor responsive to the switching device disabling the energy storage device.

6. The UPS system of claim 5, wherein controlling the second switching device to charge the second capacitor includes:
   controlling the second switching device to enable the energy storage device to provide current to the fourth inductor, wherein providing current to the fourth inductor includes inducing a voltage across the third inductor; and
   controlling the second switching device to disable the energy storage device from providing current to the fourth inductor,
   wherein the third inductor is configured to discharge the second charging current to the second capacitor responsive to the switching device disabling the energy storage device.

7. The UPS system of claim 1, wherein the backup branch portion further includes:
   a switching device having a first connection coupled to the energy storage device and a second connection switchably coupled to the second inductor; and
   a diode having an anode connection coupled to the first connection of the switching device and a cathode connection coupled to the second connection of the switching device.

8. The UPS system of claim 1, further comprising a switching device including:
   a first connection coupled to the output; and
   a second connection configured to be coupled to one of the output circuit or the first input,
   wherein the controller is configured to control the switching device to connect the second connection to the first input in a bypass mode of operation, and is configured to control the switching device to connect the second connection to the output circuit in the normal mode of operation and the backup mode of operation.

9. The UPS system of claim 1, further comprising:
   a first diode having a cathode connection coupled to the first inductor, and an anode connection coupled to a reference node; and
   a second diode having a cathode connection coupled to the reference node, and an anode connection coupled to the third inductor.

10. A non-transitory computer-readable medium storing thereon sequences of computer-executable instructions for controlling a power device comprising a first input to receive first input power, a second input to receive second input power, an output to provide output power, an output circuit including a first capacitor and a second capacitor to provide the output power to the output, and a power conversion circuit including a primary branch portion having a first inductor coupled to a first switching device and a third inductor coupled to the first switching device, and a backup branch portion having a second inductor coupled to a second switching device and a fourth inductor coupled to a third switching device, the second inductor being magnetically coupled to the first inductor, and the fourth inductor being magnetically coupled to the third inductor, the sequences of computer-executable instructions including instructions that instruct at least one processor to:
   control the first switching device to provide the first input power to the first inductor in a normal mode of operation;
   control the first switching device to discharge, by the first inductor in the normal mode of operation, first power derived from the first input power to the output circuit;
   control, in a backup mode of operation, the second switching device to induce a voltage across the first inductor and discharge the first inductor to provide a first charging current to the first capacitor to charge the first capacitor; and
   control, in the backup mode of operation, the third switching device to induce a voltage across the third inductor and discharge the third inductor to provide a second charging current to the second capacitor to charge the second capacitor.

11. The non-transitory computer-readable medium of claim 10, the sequences of computer-executable instructions further including instructions that instruct the at least one processor to
control the second switching device to provide the first charging current to the first capacitor at a first rate, and
control the third switching device to provide the second charging current to the second capacitor at a second rate, wherein the first rate is different than the second rate and wherein the first charging current is provided simultaneously with the second charging current.

12. The non-transitory computer-readable medium of claim 10, wherein the power device further includes a fourth switching device having a first connection coupled to the output, and a second connection configured to be coupled to one of the output circuit or the first input, and wherein the sequences of computer-executable instructions further include instructions that instruct the at least one processor to control the fourth switching device to connect the second connection to the first input in a bypass mode of operation, and to control the fourth switching device to connect the second connection to the output circuit in the normal mode of operation and the backup mode of operation.

13. A method for controlling a power device comprising a first input to receive first input power, a second input to receive second input power, an output to provide output power, an output circuit including a first capacitor and a second capacitor to provide the output power to the output, and a power conversion circuit including a primary branch portion having a first inductor and a third inductor, and a backup branch portion having a second inductor and a fourth inductor, the second inductor being magnetically coupled to the first inductor, and the fourth inductor being magnetically coupled to the third inductor, the method comprising:
providing the first input power to the first inductor in a normal mode of operation;
discharging, by the first inductor in the normal mode of operation, first power derived from the first input power to the output circuit;
inducing, in a backup mode of operation, a voltage across the first inductor and discharging the first inductor to provide a first charging current to the first capacitor to charge the first capacitor; and
inducing, in the backup mode of operation, a voltage across the third inductor and discharging the third inductor to provide a second charging current to the second capacitor to charge the second capacitor.

14. The method of claim 13, the method comprising:
providing the first charging current to the first capacitor at a first rate; and
providing the second charging current to the second capacitor at a second rate, wherein the first rate is different than the second rate and wherein the first charging current is provided simultaneously with the second charging current.

15. The method of claim 13, wherein the power device further includes a switching device having a first connection coupled to the output, and a second connection configured to be coupled to one of the output circuit or the first input, and wherein the method further comprises:
controlling the switching device to connect the second connection to the first input in a bypass mode of operation; and
controlling the switching device to connect the second connection to the output circuit in the normal mode of operation and the backup mode of operation.

* * * * *